(12) United States Patent
Han et al.

(10) Patent No.: US 9,229,479 B2
(45) Date of Patent: Jan. 5, 2016

(54) ELECTRONIC APPARATUS AND DOCKING STATION

(71) Applicant: Lenovo (Beijing) Limited, Beijing (CN)

(72) Inventors: Liang Han, Beijing (CN); Runsheng Liang, Beijing (CN); Ping Tian, Beijing (CN); Jianglei Wei, Beijing (CN)

(73) Assignee: Lenovo (Beijing) Limited (CN)

( * ) Notice: Subject to any disclaimer, the term of this patent is extended or adjusted under 35 U.S.C. 154(b) by 116 days.

(21) Appl. No.: 14/281,265

(22) Filed: May 19, 2014

(65) Prior Publication Data

US 2014/0340840 A1 Nov. 20, 2014

(30) Foreign Application Priority Data

May 20, 2013 (CN) .......................... 2013 1 0188279
Aug. 15, 2013 (CN) .......................... 2013 1 0356698

(51) Int. Cl.
*G06F 1/16* (2006.01)
*G06F 1/18* (2006.01)

(52) U.S. Cl.
CPC ............ *G06F 1/1632* (2013.01); *G06F 1/1681* (2013.01); *G06F 1/182* (2013.01)

(58) Field of Classification Search
USPC ............... 257/312, 401, 48, 368; 365/185.05, 365/185.18; 361/679.43, 679.55, 679.26, 361/679.31, 679.27, 679.01, 679.28, 679.3, 361/679.41, 679.56, 679.17, 679.29, 361/679.02, 679.47, 679.21, 679.49, 361/679.48, 679.04, 679.23; 248/550, 576, 248/65, 157, 68.1, 317, 372.1, 471, 448, 248/125.1, 352; 439/578, 660, 607.1, 66, 439/676, 176, 485, 162, 291; 345/169, 173, 345/168, 690, 104, 156, 163, 629
See application file for complete search history.

(56) References Cited

U.S. PATENT DOCUMENTS

| | | | | |
|---|---|---|---|---|
| 2009/0244012 | A1* | 10/2009 | Behar | ..................... G06F 1/162 345/169 |
| 2013/0170126 | A1* | 7/2013 | Lee | ....................... G06F 1/1654 361/679.17 |
| 2014/0247551 | A1* | 9/2014 | Xia | ....................... G06F 1/1681 361/679.43 |

* cited by examiner

*Primary Examiner* — Hung Duong
(74) *Attorney, Agent, or Firm* — Schwegman Lundberg & Woessner, P.A.

(57) ABSTRACT

The present invention provides an electronic apparatus and a docking station, thereby solving the conventional technical problem that the electronic apparatus is damaged because it cannot sustain the excessive force applied by the user to the auxiliary device during separating the electronic apparatus from the auxiliary device since the electronic apparatus is coupled to the auxiliary device by the spring and the engagement mechanism. The electronic apparatus comprises a first body including N first coupling members; a second body including N second coupling members mated with the first coupling members, wherein when the first body and the second body are kept in contact with each other, the first body is coupled to the second body by cooperation of the N first coupling members and the N second coupling members if the first body and the second body are in a first relative position, and the first body is decoupled from the second body so that the first body is separable from the second body by cooperation of the N first coupling members and the N second coupling members if the first body and the second body are in a second relative position different from the first relative position.

20 Claims, 10 Drawing Sheets

ELECTRONIC APPARATUS AND DOCKING STATION

The present application claims the priority and benefits of Chinese Applications No. 201310356698.6, filed on Aug. 15, 2013 and No. 201310188279.6, filed on May 20, 2013, in the Chinese Intellectual Property Office, the disclosure of which is incorporated herein in its entirety by reference.

BACKGROUND OF THE INVENTION

1. Field of the Invention

The present invention relates to a field of computer, and in particular to an electronic apparatus and a docking station.

2. Description of the Related Art

With the development of IT and computer technology, more and more electronic apparatuses, such as a tablet computer, an intelligent mobile phone, and a smart TV, have entered into people's life, work and the like, and have brought much convenience to the people. Currently, take the notebook computer for example, in order to improve the user experience, the notebook computer manufacturers have launched a super notebook computer having the forms of the tablet computer and the notebook computer. The super notebook computer includes a tablet computer and an auxiliary input device. The user can achieve the notebook computer form of the supper notebook computer by coupling the tablet computer to the auxiliary device. When the user wants to go out, he can also separate the tablet computer from the auxiliary device and carry only the tablet computer, thereby achieving the tablet computer form of the super notebook computer. Usually, the auxiliary device is provided with at least one spring for supporting the tablet computer after the tablet computer is coupled to the auxiliary device. When the user couples the tablet computer to the auxiliary device, the user inserts an engagement hook of the auxiliary device into an engagement opening of the tablet computer, and then moves the tablet computer towards the auxiliary device. As a result, the at least one spring is deformed to generate a restoring force, thereby supporting the tablet computer. Further, the user continues to move the tablet computer towards the auxiliary device, so that the engagement hook is engaged with the engagement opening. During this process, the user needs to apply a force to the tablet computer against the supporting force until the engagement hook is completely engaged with the engagement opening. Similarly, when the user separates the tablet computer from the auxiliary device, he repeats the above process. In other words, the user continues to forcibly press the tablet computer towards the auxiliary device against the force of the at least one spring for supporting the tablet computer, so that the spring is maximally deformed. As a result, the engagement hook can be separated from the engagement opening. In this case, the user can separate the tablet computer from the auxiliary device by pulling the tablet computer away from the auxiliary device.

However, during achieving technical solutions in embodiments of the present invention by the inventors of the present application, the inventors found that there are at least the following technical problems in the above technique.

The spring and the engagement device are adopted as a coupling mechanism between the tablet computer and the auxiliary device. Therefore, when the user wants to separate the tablet computer from the auxiliary device, he must forcibly press the tablet computer towards the auxiliary device so that the spring is maximally deformed and thus the engagement hook can be separated from the engagement opening. Then, the user separates the tablet computer from the auxiliary device by pulling the tablet computer away from the auxiliary device. In this way, the engagement mechanism is probably damaged if the user applies an excessive force during pressing the tablet computer towards the auxiliary device. Further, the electronic apparatus is coupled to the auxiliary device by the spring and the engagement mechanism. Therefore, the electronic apparatus is probably damaged because the electronic apparatus cannot sustain the excessive force applied by the user to the auxiliary device during separating the electronic apparatus from the auxiliary device. In addition, since the electronic apparatus is coupled to the auxiliary device by the spring and the engagement mechanism, this configuration causes difficulty and complexity in coupling or separating the electronic apparatus to or from the auxiliary device by the user, and bad user experience.

With the development of information technology in the whole world, electronic products have fully permeated into people's lives. Many electronic apparatus such as the notebook computer, the mobile phone and the tablet computer have become wildly popular communication tools due to their portability.

In many cases, an electronic apparatus can work in a variety of ways. For example, the tablet computer can be used as the notebook computer if the tablet computer is inserted into a keyboard base, and can be separately used if the tablet computer is removed from the keyboard base.

However, during achieving embodiments of the present application, the applicant found that there are at least the following defects.

Currently, there are many separable notebook computers on the market. Usually, in order to achieve separation, it is necessary to design complex mechanical structure and for a user to cooperate by means of a plurality of separation operations during separation. Similarly, during coupling, in order to achieve coupling, it is necessary for the user to cooperate by a plurality of coupling operations. Therefore, operation of the separable electronic apparatus is complicated during coupling or separation due to its complicated structural design.

SUMMARY OF THE INVENTION

An object of the present invention is to provide an electronic apparatus and a docking station, thereby solving the conventional technical problem that the electronic apparatus may be damaged because it cannot sustain the excessive force applied by the user to the auxiliary device during separating the electronic apparatus from the auxiliary device since the electronic apparatus is coupled to the auxiliary device by the spring and the engagement mechanism.

Embodiments of the present application solve the technical problem that operation of the separable electronic apparatus is complicated during coupling or separation due to its complicated structural design, by providing an electronic apparatus.

In accordance with an aspect of the present invention, there is provided an electronic apparatus comprising: a first body including N first coupling members, where N is an integer greater than or equal to 1; a second body including N second coupling members mated with the first coupling members, wherein when the first body and the second body are kept in contact with each other, the first body is coupled to the second body by cooperation of the N first coupling members and the N second coupling members if the first body and the second body are in a first relative position, and the first body is decoupled from the second body so that the first body is separable from the second body by cooperation of the N first coupling members and the N second coupling members if the first body and the second body are in a second relative position different from the first relative position.

Alternatively, the first body can move relative to the second body in a first manner and a second manner different from the first manner, wherein the first body is decoupled from the second body after the first body moves relative to the second body in the first manner from the first relative position to the second relative position, and the first body is still kept coupled to the second body after the first body moves relative to the second body in the second manner from the first relative position to the second relative position.

Alternatively, after the first body moves relative to the second body in the first manner from the first relative position to the second relative position, the N first coupling members switch from a first state to a second state different from the first state, and are decoupled from the N second coupling members so that the first body is decoupled from the second body.

Alternatively, the second body further comprises a shaft, and the shaft is disposed on a first side of the N second coupling members so that when the first body and the second body are kept in contact with each other, the first body can rotate relative to the second body around the shaft from the first relative position to the second relative position.

Alternatively, when the first body and the second body can continuously rotate through the shaft from the first relative position through at least one transition position included between the first relative position and the second relative position to the second relative position, the first body is decoupled from the second body so that the first body is separable from the second body.

Alternatively, the second body further comprises a first cam fitted over the shaft, the first cam comprises: a first engagement member; a second engagement member; and a linkage member disposed to the second engagement member to be capable of being separably connected to the second coupling member, wherein during rotation of the first body relative to the second body from the first relative position to the second relative position, the first engagement member rotates relative to the second engagement member from a first position to a second position, such that the second engagement member slides relative to the shaft in a first direction and drives the second coupling member to slide in the first direction through the linkage member, so that the first coupling member is decoupled from the second coupling member, and thus the first body is separable from the second body.

Alternatively, the first engagement member comprises a first end provided with at least two recesses; and the second engagement member comprises a second end and a third end different from the second end, wherein the second end is provided with at least two protrusions mated with the at least two recesses, and the linkage member is disposed to the third end; wherein when the first engagement member is in the first position relative to the second engagement member, the at least two recesses and the at least two protrusions are in a first state; and when the first engagement member is in the second position relative to the second engagement member, the at least two recesses and the at least two protrusions are in a second state different from the first state.

Alternatively, the second body further comprises a force application mechanism, and the force application mechanism is configured to provide a first force to the first body such that the first body is decoupled and separated from the second body, when the first body and the second body are in the second relative position.

Alternatively, when the first body is in the second relative position relative to the second body, a proportion in which an external force applied by a user to the first body and/or the second body is converted into the first force is greater than a first threshold, wherein the first force is a minimal force by which the first body can be separated from the second body.

In accordance with another aspect of the present invention, there is provided a docking station which can be separably connected to an electronic apparatus. The electronic apparatus is provided with N first coupling members, where N is an integer greater than or equal to 1. The docking station includes N second coupling members mated with the N first coupling members, wherein when the electronic apparatus and the docking station are kept in contact with each other, the electronic apparatus is coupled to the docking station by cooperation of the N first coupling members and the N second coupling members if the electronic apparatus and the docking station are in a first relative position, and the electronic apparatus is decoupled from the docking station so that the electronic apparatus is separable from the docking station by cooperation of the N first coupling members and the N second coupling members if the electronic apparatus and the docking station are in a second relative position different from the first relative position.

Alternatively, the electronic apparatus can move relative to the docking station in a first manner and a second manner different from the first manner, wherein the electronic apparatus is decoupled from the docking station when the electronic apparatus moves relative to the docking station in the first manner from the first relative position to the second relative position, and the electronic apparatus is still kept coupled to the docking station when the electronic apparatus moves relative to the docking station in the second manner from the first relative position to the second relative position.

Alternatively, when the electronic apparatus moves relative to the docking station in the first manner from the first relative position to the second relative position, the N first coupling members switch from a first state to a second state different from the first state, and are decoupled from the N second coupling members so that the electronic apparatus is decoupled from the docking station.

Alternatively, the docking station further comprises a shaft, and the shaft is disposed on a first side of the N second coupling members so that when the electronic apparatus and the docking station are kept in contact with each other, the electronic apparatus can rotate relative to the docking station around the shaft from the first relative position to the second relative position.

Alternatively, when the electronic apparatus and the docking station can continuously rotate through the shaft from the first relative position through at least one transition position included between the first relative position and the second relative position to the second relative position, the electronic apparatus is decoupled from the docking station so that the electronic apparatus is separable from the docking station.

Alternatively, the docking station further comprises a first cam fitted over the shaft, the first cam comprises: a first engagement member; a second engagement member; and a linkage member disposed to the second engagement member to be capable of being separably connected to the second coupling member, wherein during rotation of the electronic apparatus relative to the docking station from the first relative position to the second relative position, the first engagement member rotates relative to the second engagement member from a first position to a second position, such that the second engagement member slides relative to the shaft in a first direction and drives the second coupling member to slide in the first direction through the linkage member, so that the first coupling member is decoupled from the second coupling member, and thus the electronic apparatus is separable from the docking station.

Alternatively, the first engagement member comprises a first end provided with at least two recesses; and the second engagement member comprises a second end and a third end different from the second end, wherein the second end is provided with at least two protrusions mated with the at least two recesses, and the linkage member is disposed to the third end; wherein when the first engagement member is in the first position relative to the second engagement member, the at least two recesses and the at least two protrusions are in a first state; and when the first engagement member is in the second position relative to the second engagement member, the at least two recesses and the at least two protrusions are in a second state different from the first state.

Alternatively, the docking station further comprises a force application mechanism, and the force application mechanism is configured to provide a first force to the electronic apparatus such that the electronic apparatus is decoupled and separated from the docking station, when the electronic apparatus and the docking station are in the second relative position.

Alternatively, when the electronic apparatus is in the second relative position relative to the docking station, a proportion in which an external force applied by a user to the electronic apparatus and/or the docking station is converted into the first force is greater than a first threshold, wherein the first force is a minimal force by which the electronic apparatus can be separated from the docking station.

One of more technical solutions provided in the embodiments of the present application have at least the following technical effects or advantages.

1. When the first body and the second body are kept in contact with each other, the first body can be coupled to the second body to be integrated by cooperation of the N first coupling members and the N second coupling members if the first body and the second body are in the first relative position. In this case, even if the first force away from the second body is applied to the first body, the first body cannot be separated from the second body. However, when the first body and the second body are in the second relative position, the first body is decoupled from the second body but the first body and the second body are still kept in contact with each other by cooperation of the N first coupling members and the N second coupling members. In this case, if the above mentioned first force is applied to the first body, the first body will be separated from the second body. Therefore, when a user separates the first body from the second body, he need not apply a large force but he only needs to adjust the relative position of the first body and the second body to the second relative position and thereby he can easily separate the first body from the second body. As a result, the present invention effectively solves the conventional technical problem that the electronic apparatus is damaged because it cannot sustain the excessive force applied by the user to the auxiliary device during separating the electronic apparatus from the auxiliary device since the electronic apparatus is coupled to the auxiliary device by the spring and the engagement mechanism, thereby lengthening the lift time of the electronic apparatus. Furthermore, since a user can easily separate the first body from the second body with a less force, the present invention provides an excellent user experience.

2. The first body can move relative to the second body in the first manner and the second manner different from the first manner. The first body is decoupled from the second body when the first body moves relative to the second body in the first manner from the first relative position to the second relative position, and the first body is still kept coupled to the second body when the first body moves relative to the second body in the second manner from the first relative position to the second relative position. In other words, the first body and the second body can be adjusted from the first relative position to the second relative position in many manners. However, only if the first body moves in the first manner, can the first body be decoupled and further separated from the second body when the first body and the second body are in the second relative position. When the first body moves in the second manner such that the first body and the second body are in the second relative position, the first body is still kept coupled to and integrated with the second body. In this way, the reliability of coupling between the first body and the second body is enhanced so that when a user moves the first body in the second manner, he need not worry that the first body may be separated from the second body so that his operation will be affected, thereby improving user experience.

3. When the first body and the second body can continuously rotate through the shaft from the first relative position through at least one transition position included between the first relative position and the second relative position to the second relative position, the first body is decoupled from the second body so that the first body is separable from the second body. In other words, only if the first body and the second body are subjected to the continuous rotation process, can the first body be decoupled and further separated from the second body. If the first body and the second body are not subjected to the continuous rotation, but they are adjusted directly from the first relative position to the second relative position, the first body is still kept coupled to and inseparable from the second body. In this way, the reliability of coupling between the first body and the second body of the electronic apparatus is enhanced, thereby improving user experience.

In accordance with a further aspect of the present invention, there is provided the following technical solutions:

an electronic apparatus comprising:

a first body including N first coupling members, where N is an integer greater than or equal to 1; and a second body including N second coupling members mated with the first coupling members, wherein the first body and the second body have at least a first relative position and a second relative position;

when the first body and the second body are in the first relative position, the first body is coupled to the second body by cooperation of the N first coupling members and the N second coupling members;

when the first body and the second body are in the second relative position, the first body is decoupled from the second body by cooperation of the N first coupling members and the N second coupling members, so that the first body is separated from the second body;

during moving the first body and the second body from the first relative position to the second relative position by means of an external force, the first body rotates on a second edge of the second body as an axis of rotation such that the first body is separated from a first edge of the second body prior to separation of the first body from the second edge of the second body, and/or the second body rotates on a second edge of the first body as an axis of rotation such that the second body is separated from a first edge of the first body prior to separation of the second body from the second edge of the first body.

Preferably, the first body further comprises:

a first front surface;

a first back surface; and a first side surface which connects the first front surface and the first back surface and to which the N first coupling members are disposed, wherein the first edge of the first body is a boundary line between the first front surface and the first side surface, the second edge of the first body is a boundary line between the first back surface and the first side surface, the first front surface forms a first angle with the first side surface, the first back surface forms a second angle with the first side surface, the first angle is greater than 90 degrees, and the second angle is less than 90 degrees.

Preferably, the second body further comprises:

a second front surface;

a second back surface; and a second side surface which connects the second front surface and the second back surface and to which the N second coupling members are disposed, wherein the first edge of the second body is a boundary line between the second front surface and the second side surface, the second edge of the second body is a boundary line between the second back surface and the second side surface, the second front surface forms the first angle with the second side surface, and the second back surface forms the second angle with the second side surface;

when the first body and the second body are in the first relative position, the first side surface and the second side surface are coupled to and just face each other, the first front surface forms a third angle with the second front surface, and the third angle is greater than or equal to 90 degrees; and when the first body and the second body are in the second relative position, the first front surface forms a fourth angle with the second front surface, the fourth angle is equal to 180 degrees, and a distance between the second edge of the first body and the second edge of the second body is less than or equal to a first preset distance.

Preferably, the first coupling member has a first magnetic performance, and the second coupling member has a second magnetic performance opposite to the first magnetic performance, wherein when the first body and the second body are in the first relative position, the first body can be coupled to the second body by a magnetic attraction force between the N first coupling members and the N second coupling members.

Preferably, the first coupling member specifically comprises:

a first hole formed in the first side surface;

an iron slide bar disposed in the first hole; and an elastic element fixed to a hole bottom of the first hole and connected to the iron slide bar.

Preferably, the second coupling member specifically comprises:

a second hole formed in the second side surface to be mated with the first hole; and a magnet disposed in the second hole, wherein when the first body and the second body are in the first relative position, the first hole and the second hole just face each other, and the iron slide bar enters into the second hole under the action of an attraction force of the magnet to fix the second body so that the first body is stably coupled to the second body; and during moving the first body and the second body from the first relative position to the second relative position by means of an external force, the first body rotates on the second edge of the second body as an axis of rotation such that a distance between the first edge of the first body and the first edge of the second body is greater than a second preset distance. In this case, the attraction force applied by the magnet to the iron slide bar is released, and the elastic element pulls the iron slide bar back into the first hole, so that the first body is separated from the second body.

Preferably, the first front surface is provided with M third coupling members with the first magnetic performance, and the second front surface is provided with M fourth coupling members with the second magnetic performance, where M is an integer greater than or equal to 1;

wherein the first body and the second body further have a third relative position, and wherein when the first body and the second body are in the third relative position, the first front surface and the second front surface are coupled to and just face each other by a magnetic attraction force between the M third coupling members and the M fourth coupling members; and during moving the first body and the second body from the third relative position to the first relative position by means of an external force, the first body rotates on the first edge of the second body as an axis of rotation such that the first body is coupled to the second edge of the second body, and/or the second body rotates on the first edge of the first body as an axis of rotation such that the second body is coupled to the second edge of the first body.

Preferably, the electronic apparatus further comprises:

a position detection device disposed in the first body and/or the second body for detecting a relative position between the first body and the second body.

Preferably, the electronic apparatus further comprises:

a processor disposed in the first body or the second body and connected to the position detection device to control the electronic apparatus to enter into a first mode when the first body and the second body are in the first relative position; and/or control the electronic apparatus to enter into a second mode when the first body and the second body are in the second relative position; and/or control the electronic apparatus to enter into a third mode when the first body and the second body are in the third relative position.

Preferably, the first body further comprises:

a first functional body located in a first accommodation chamber formed by the first front surface, the first side surface and the first back surface; and a first touch screen display unit embedded on the first front surface; and the second body further comprises:

a second functional body located in a second accommodation chamber formed by the second front surface, the second side surface and the second back surface; and a second touch screen display unit embedded on the second front surface.

Preferably, the first mode is specifically a notebook computer mode, and the notebook computer mode is specifically a mode in which the first body and the second body cooperate in a state where the first functional body simulates a mainframe of a notebook computer, the first touch screen display unit simulates a keyboard and/or a touch pad of the notebook computer, and the second touch screen display unit simulates a display unit of the notebook computer.

Preferably, the second mode is specifically a share mode, and the share mode is specifically a mode in which the first touch screen display unit and the second touch screen display unit display a picture together so that a plurality of users can watch the picture through the first touch screen display unit and the second touch screen display unit.

Preferably, the third mode is specifically a standby mode.

In accordance with a still further aspect of the present invention, there is provided the following technical solutions:

a first electronic apparatus comprising:

N first coupling members, where N is an integer greater than or equal to 1;

wherein the first electronic apparatus and a second electronic apparatus can have at least a first relative position and a second relative position by the N first coupling members; and the second electronic apparatus comprises N second coupling members mated with the first coupling members;

when the first electronic apparatus and the second electronic apparatus are in the first relative position, the first electronic apparatus is coupled to the second electronic apparatus by cooperation of the N first coupling members and the N second coupling members;

when the first electronic apparatus and the second electronic apparatus are in the second relative position, the first electronic apparatus is decoupled from the second electronic apparatus by cooperation of the N first coupling members and the N second coupling members, so that the first electronic apparatus is separated from the second electronic apparatus;

during moving the first electronic apparatus and the second electronic apparatus from the first relative position to the second relative position by means of an external force, the first electronic apparatus rotates on a second edge of the second electronic apparatus as an axis of rotation such that the first electronic apparatus is separated from a first edge of the second electronic apparatus prior to separation of the first electronic apparatus from the second edge of the second electronic apparatus, and/or the second electronic apparatus rotates on a second edge of the first electronic apparatus as an axis of rotation such that the second electronic apparatus is separated from a first edge of the first electronic apparatus prior to separation of the second electronic apparatus from the second edge of the first electronic apparatus.

Preferably, the first electronic apparatus further comprises:

a first front surface and a first back surface;

a first side surface which connects the first front surface and the first back surface and to which the N first coupling members are disposed, wherein the first edge of the first electronic apparatus is a boundary line between the first front surface and the first side surface, the second edge of the first electronic apparatus is a boundary line between the first back surface and the first side surface, the first front surface forms a first angle with the first side surface, the first back surface forms a second angle with the first side surface, the first angle is greater than 90 degrees, and the second angle is less than 90 degrees;

and the second electronic apparatus further comprises: a second front surface, a second back surface, and a second side surface which connects the second front surface and the second back surface and to which the N second coupling members are disposed;

wherein the first edge of the second electronic apparatus is a boundary line between the second front surface and the second side surface, the second edge of the second electronic apparatus is a boundary line between the second back surface and the second side surface, the second front surface forms the first angle with the second side surface, and the second back surface forms the second angle with the second side surface;

when the first electronic apparatus and the second electronic apparatus are in the first relative position, the first side surface and the second side surface are coupled to and just face each other, the first front surface forms a third angle with the second front surface, and the third angle is greater than or equal to 90 degrees; and when the first electronic apparatus and the second electronic apparatus are in the second relative position, the first front surface forms a fourth angle with the second front surface, the fourth angle is equal to 180 degrees, and a distance between the second edge of the first electronic apparatus and the second edge of the second electronic apparatus is less than or equal to a first preset distance.

Preferably, the first coupling member has a first magnetic performance, and the second coupling member has a second magnetic performance opposite to the first magnetic performance, wherein when the first electronic apparatus and the second electronic apparatus are in the first relative position, the first electronic apparatus can be coupled to the second electronic apparatus by a magnetic attraction force between the N first coupling members and the N second coupling members.

Preferably, the first coupling member specifically comprises:

a first hole formed in the first side surface;

an iron slide bar disposed in the first hole; and an elastic element fixed to a hole bottom of the first hole and connected to the iron slide bar; and the second coupling member specifically comprises:

a second hole formed in the second side surface to be mated with the first hole; and a magnet disposed in the second hole, wherein when the first electronic apparatus and the second electronic apparatus are in the first relative position, the first hole and the second hole just face each other, and the iron slide bar enters into the second hole under the action of an magnetic attraction force of the magnet to fix the second electronic apparatus so that the first electronic apparatus is stably coupled to the second electronic apparatus; and during moving the first electronic apparatus and the second electronic apparatus from the first relative position to the second relative position by means of an external force, the first electronic apparatus rotates on the second edge of the second electronic apparatus as an axis of rotation such that a distance between the first edge of the first electronic apparatus and the first edge of the second electronic apparatus is greater than a second preset distance value. In this case, the attraction force applied by the magnet to the iron slide bar is released, and the elastic element pulls the iron slide bar back into the first hole, so that the first electronic apparatus is separated from the second electronic apparatus.

Preferably, the first front surface is provided with M third coupling members with the first magnetic performance, and the second front surface is provided with M fourth coupling members with the second magnetic performance, where M is an integer greater than or equal to 1;

wherein the first electronic apparatus and the second electronic apparatus further have a third relative position, and wherein when the first electronic apparatus and the second electronic apparatus are in the third relative position, the first front surface and the second front surface are coupled to and just face each other by a magnetic attraction force between the M third coupling members and the M fourth coupling members; and during moving the first electronic apparatus and the second electronic apparatus from the third relative position to the first relative position by means of an external force, the first electronic apparatus rotates on the first edge of the second electronic apparatus as an axis of rotation such that the first electronic apparatus is coupled to the second edge of the second electronic apparatus, and/or the second electronic apparatus rotates on the first edge of the first electronic apparatus as an axis of rotation such that the second electronic apparatus is coupled to the second edge of the first electronic apparatus.

Preferably, the first electronic apparatus further comprises:
a position detection device for detecting a relative position between the first electronic apparatus and the second electronic apparatus.

Preferably, the first electronic apparatus further comprises:
a processor connected to the position detection device to control the electronic apparatus to enter into a first mode when the first electronic apparatus and the second electronic apparatus are in the first position; and/or
control the electronic apparatus to enter into a second mode when the first electronic apparatus and the second electronic apparatus are in the second position; and/or
control the electronic apparatus to enter into a third mode when the first electronic apparatus and the second electronic apparatus are in the third position.

One of more technical solutions provided in the embodiments of the present application have at least the following technical effects or advantages.

1. In the embodiments of the present application, there is provided an electronic apparatus comprising: the first body, the second body, the N first coupling members disposed to the first body, and the N second coupling members disposed to the second body. A user can couple or separate the first body to or from the second body through the N first coupling members and the N second coupling members by a simple rotational operation. Therefore, the present invention effectively solves the technical problems that operation of the separable electronic apparatus is complicated during coupling or separation due to its complicated structural design, thereby achieving the technical effects of coupling or separating the two bodies of the electronic apparatus conveniently and quickly.

2. In the embodiments of the present application, the first coupling member and the second coupling member adopt the magnetic attraction force. When the first body and the second body are in the first relative position, the magnet hidden in the second coupling member can attract the iron slide bar, located in the first coupling member, into the second hole of the second coupling member to couple the first body to the second body. The first coupling member and the second coupling member not only function to couple the first body to the second body, but they also function to support the second body so that the second body is stably in the first relative position. Therefore, the present invention achieves the technical effects that the coupling process is simple and the coupling is firm.

3. In the embodiments of the present application, the electronic apparatus comprises a processor. Therefore, the electronic apparatus can be adjusted into different modes such as a notebook computer operation mode and a share operation mode based on different relative position relationships between the first body and the second body, thereby satisfying user's different requirements.

DETAILED DESCRIPTION OF THE EMBODIMENTS

Embodiment 1

Figure 1:
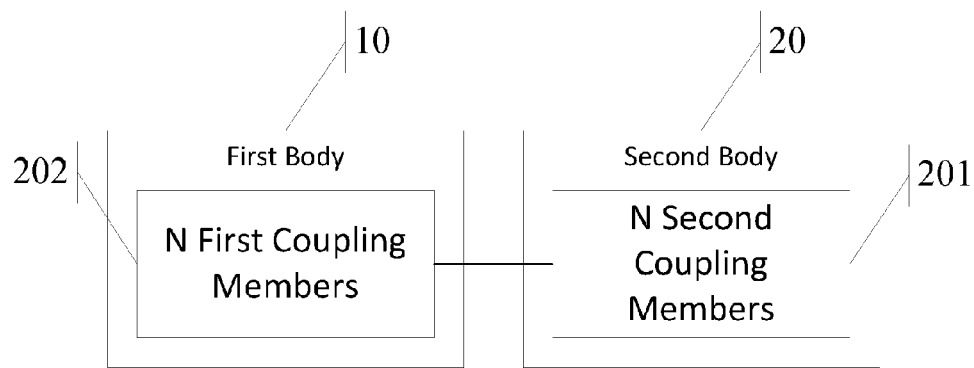
FIG. 1 is a schematic diagram showing a structure of an electronic apparatus according to a first embodiment of the present invention.

In the embodiment of the present invention, the present invention provides an electronic apparatus and a docking station, thereby solving the conventional technical problem that the electronic apparatus is damaged because it cannot sustain the excessive force applied by the user to the auxiliary device during separating the electronic apparatus from the auxiliary device since the electronic apparatus is coupled to the auxiliary device by the spring and the engagement mechanism.

In the embodiment, in order to solve the conventional technical problem that the electronic apparatus is damaged because it cannot sustain the excessive force applied by the user to the auxiliary device during separating the electronic apparatus from the auxiliary device, a general concept of the technical solution is as follows.

When the first body and the second body are kept in contact with each other, the first body can be coupled to the second body to be integrated by cooperation of the N first coupling members and the N second coupling members if the first body and the second body are in the first relative position. In this case, even if the first force away from the second body is applied to the first body, the first body cannot be separated from the second body. However, when the first body and the second body are in the second relative position, the first body is decoupled from the second body but the first body and the second body are still kept in contact with each other by cooperation of the N first coupling members and the N second coupling members. In this case, if the above mentioned first force is applied to the first body, the first body will be separated from the second body. Therefore, when a user separates the first body from the second body, he need not apply a large force but he only needs to adjust the relative position of the first body and the second body to the second relative position and thereby he can easily separate the first body from the second body. As a result, the present invention effectively solves the conventional technical problem that the electronic apparatus is damaged because it cannot sustain the excessive force applied by the user to the auxiliary device during separating the electronic apparatus from the auxiliary device since the electronic apparatus is coupled to the auxiliary device by the spring and the engagement mechanism, thereby lengthening the lift time of the electronic apparatus. Furthermore, since a user can easily separate the first body from the second body with a less force, the present invention provides an excellent user experience.

A further description of the present invention will be made as below with reference to embodiments of the present invention taken in conjunction with the accompanying drawings. It should be understood that the embodiments of the present invention and the specific features in the embodiments are used to describe the technical solutions of the present invention in detail, but the present invention is not limited thereto. The embodiments of the present invention and the specific features in the embodiments may be combined with each other unless they conflict.

In the embodiment, the present invention provides an electronic apparatus. As shown in FIG. 1, the electronic apparatus comprises: a first body 10 including N first coupling members 101, where N is an integer greater than or equal to 1; a second body 20 including N second coupling members 201 mated with the first coupling member 101. When the first body 10 and the second body 20 are kept in contact with each other, the first body 10 is coupled to the second body 20 by cooperation of the N first coupling members 101 and the N second coupling members 201 if the first body 10 and the second body 20 are in a first relative position, and the first body 10 is decoupled from the second body 20 so that the first body 10 is separable from the second body 20 by cooperation of the N first coupling members 101 and the N second coupling members 201 if the first body 10 and the second body 20 are in a second relative position different from the first relative position. Here, N may be an integer such as 1, 2, 3, 5 and 10. N is not specifically defined.

The above mentioned terms "coupling" and "coupled" have the following meaning. When the first body 10 and the second body 20 are in contact with each other and in the first relative position, the first body 10 is coupled to the second body 20 to be integrated by cooperation of the N first coupling members 101 and the N second coupling members 201. In this case, if the first force away from the second body 20 is applied to the first body 10, the first body 10 cannot be separated from the second body 20. However, when the first body 10 and the second body 20 are in contact with each other and in the second relative position, the first body 10 is decoupled from the second body 20 by cooperation of the N first coupling members 101 and the N second coupling members 201. In this case, if the above mentioned force is applied to the first body 10, the first body 10 is separable from the second body 20. In other words, the first body 10 can be disconnected from the second body 20 so that the first body and the second body become two individual bodies.

In the following one or more embodiments, the terms "coupling" and "coupled" have the same meaning as described above and are no longer described one by one for the sake of brevity.

The first body 10 may comprise a display unit. In a specific embodying process, the first body 10 may be a display portion of a notebook computer, or may also be a tablet computer. The second body 20 may comprise an input device such as a keyboard and a touchpad. Of course, the input device may also be a combination of the keyboard and the touchpad. In this way, the second body 20 may be a keyboard and a mainframe portion of the notebook computer, or may also be a docking station with an input device. After the first body 10 is coupled to the second body 20, the second body 20 can serve as an input device of the first body 10 by data communication between them so that the first body 10 and the second body 20 form a complete apparatus and can achieve functions such as inputting, storing or browsing. Of course, the first body 10 and the second body 20 may also be other functional bodies so long as they can achieve at least one function as an electronic apparatus as a whole after being coupled together. The first body and the second body are not specifically limited.

In a specific embodying process, the first coupling member 101 and the second coupling member 201 are coupling members mated with each other. The coupling members may be engagement members such as engagement openings and engagement hooks. Of course, the coupling members may be magnetic force members such as electromagnets, and iron pieces. The coupling members can be designed by a person having ordinary skill in the art. The coupling members are not specifically limited.

Figure 2A:
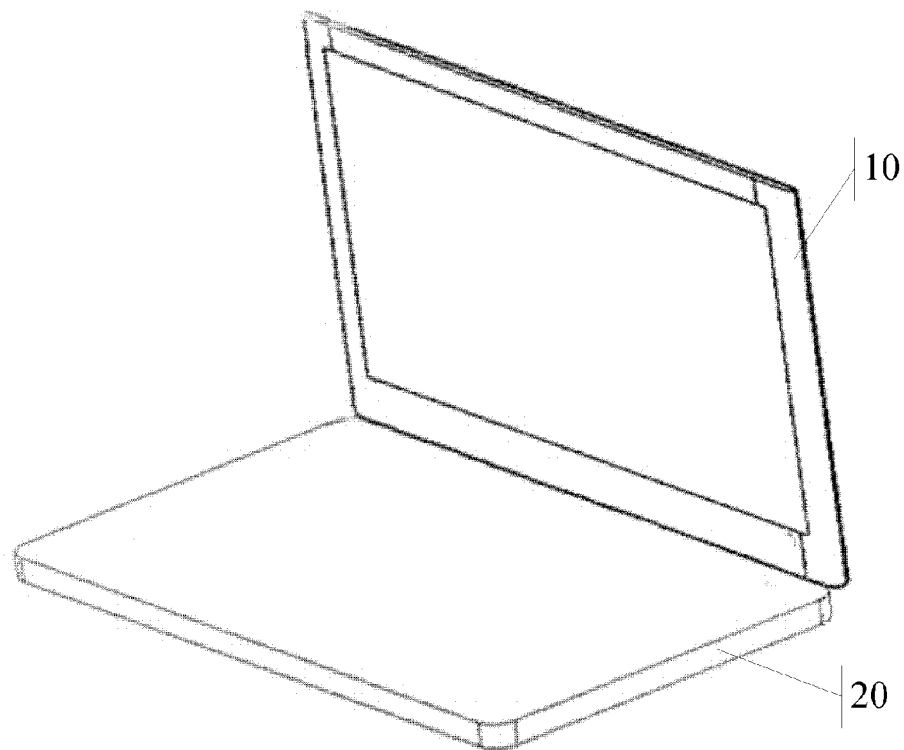
FIGS. 2A-2B are schematic views showing relative position relationships between a first body and a second body in the first embodiment of the present invention.
Figure 2B:
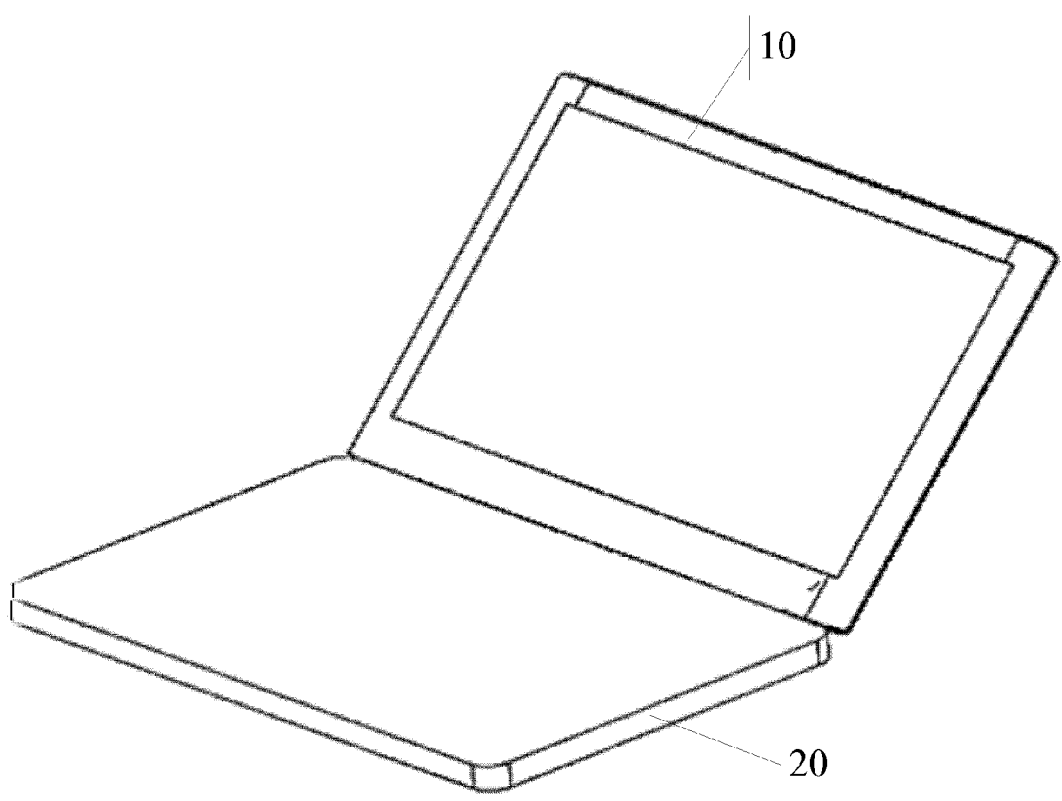

Specifically, take the engagement members as the first coupling member 101 and the second coupling member 201 for example, the first body 10 and the second body 20 have two relative positions, i.e. the first relative position as shown in FIG. 2A and the second relative position as shown in FIG. 2B. On the premise that the first body 10 and the second body 20 are kept in contact with each other, when the first body 10 and the second body 20 are in the first relative position, the N first coupling members 101 and the N second coupling members 201 are respectively coupled to each other, for example the engagement openings and the engagement hooks respectively engage with each other, so that the first body 10 and the second body 20 are also coupled to each other. On the premise that the first body 10 and the second body 20 are kept in contact with each other, when the first body 10 and the second body 20 are in the second relative position, the N first coupling members 101 and the N second coupling members 201 are respectively decoupled from each other, for example, the engagement openings and the engagement hooks do not engage with each other, so that the first body 10 and the second body 20 are also decoupled from each other. However, in this case, if the above mentioned force is not applied to the first body 10, the first body 10 and the second body 20 are still kept in contact with each other. In other words, the first body 10 and the second body 20 are still a single integral body in appearance. In this case, the first body 10 may continue to move relative to the second body 20 to reach another first relative position.

The second relative position will be described in detail as below.

The second relative position is a position in which the first body 10 is decoupled from the second body 20. The second relative position may be specifically embodied in the following embodying situations.

In the first embodying situation, the second relative position may be a boundary position within an opening and closing range of the first body 10 and the second body 20. For example, take a plate type electronic apparatus for example, if the relative position between the first body 10 and the second body 20 are represented by a degree of an included angle between the first body 10 and the second body 20, a value of the included angle corresponding to the second relative position is a boundary value of an opening and closing angle range of the first body 10 and the second body 20, and thus the value of the included angle may be 0°, 110°, 180°, or 360°. Of course, the value of the included angle may also be one of intervals including the boundary values or any angle within the intervals, for example, [0°, 5°], [105°, 110°], [175°, 180°], [355°, 360°], 3°, 107°, 179°, or 358°. In practical application, the specific value of the included angle between the first body 10 and the second body 20 needs to be determined according to an actual opening and closing angle range of the electronic apparatus. The specific value of the included angle is not specifically limited.

In the second embodying situation, the second relative position may also be a value within the opening and closing range of the first body 10 and the second body 20. Still take a plate type electronic apparatus for example, when the second relative position is a value within the opening and closing angle range of the first body 10 and the second body 20, it may be some particular positions. In this way, when the first body 10 and the second body 20 are in the these particular positions, a proportion in which an external force applied by a user to the first body 10, the second body 20, or both the first body 10 and the second body 20 is converted into the first force is greater than a first threshold. The first force is a minimal force by which the first body can be separated from the second body. In other words, the second relative position is a position in which the external force applied by the user to the first body 10, the second body 20, or both the first body 10 and the second body 20 is converted into the first force in the proportion that is greater than the first threshold.

Firstly, the first force will be described. The first force is a minimal force by which the first body 10 can be separated from the second body 20, and which is applied to the first body 10, the second body 20, or both the first body 10 and the second body 20. In other words, the first body 10 and the second body 20 can be just separated from each other by the first force.

From the point of view of a direction of the first force, the first force is a force by which the first body 10 is separated from the second body 20. Still take a plate type electronic apparatus for example, a direction of the first force is a first direction which is along the first body 10 or the second body 20 and directed from a first side where the first body 10 and the second body 20 contact towards an opposite side to the first side. Of course, the electronic apparatus may also have any other shape and is not limited to only the plate type electronic apparatus. Therefore, the first direction may also vary depending on shapes of the different electronic apparatus so long as the first direction is a direction in which the first body 10 is separated from the second body 20. The first direction is not specifically limited.

From the point of view of a magnitude of the first force, the first force is a minimal force required for separating the first body 10 from the second body 20. In other words, the first force is the minimal force applied by a mechanism of the electronic apparatus itself or a user of the electronic apparatus to the first body 10, the second body 20, or both the first body 10 and the second body 20 in order to separate the first body 10 from the second body 20. In practical application, since the structures of the electronic apparatus themselves are different, and the conditions in which the electronic apparatus receive a force are different, the value of the minimal force will accordingly vary so long as it is the minimal force among forces required for separating the first body 10 from the second body 20. The minimal force is not specifically limited.

Next, for the second embodying situation, specifically, when the first body 10 and the second body 20 are in the second relative position, i.e., the particular position, the proportion in which the external force applied by the user to the first body 10, the second body 20, or both the first body 10 and the second body 20 is converted into the first force is greater than the first threshold. In other words, a proportion of a component force, in the first direction, of the external force, applied by the user, to the external force needs to exceed the first threshold. The first threshold may be 50%, 65%, 80% or the like. Of course, in order that the external force applied by the user is used to separate the first body 10 from the second body 20 to the greatest extent possible, the more the conversion proportion, the better. Therefore, preferably, the first threshold may also be 90%, 99%, or even 100%. In practical application, since the structures of the electronic apparatus are different, and the conversion proportions expected by a person having ordinary skill in the art are different, the first threshold may be set by a person having ordinary skill in the art according to requirements. The first threshold is not specifically limited.

Preferably, in order to reach as high the conversion proportion as possible to facilitate application of a force by a user, for a plate type electronic apparatus, because of the structure of the electronic apparatus itself, the external force applied by the user to the first body 10, the second body 20, or both the first body 10 and the second body 20 may be a force perpendicular to the first body 10 or the second body 20, or may also be a force that is along the first body 10 and directed in a direction away from the second body 20, or a force that is along the second body 20 and directed in a direction away from the first body 10. In this case, the second relative position may include two situations, i.e., a position in which the first body 10 is approximately perpendicular to the second body 20, and a position in which the first body 10 and the second body 20 are approximately in the same plane.

For example, in the first situation, when the second relative position is the position in which the first body 10 is approximately perpendicular to the second body 20, the included angle between the first body 10 and the second body 20 may be one or more of angle values of 90° and 270°, one or more of the angle intervals of [85°, 95°] and [265°, 275°], or any angle value within the above mentioned angle intervals, such as 89°, 91°, 267° or 273°. Of course, the value of the included angle between the first body 10 and the second body 20 is not limited to any of the above mentioned angle values and any of the above mentioned angle intervals so long as the first body 10 is approximately perpendicular to the second body 20. The value of the included angle between the first body 10 and the second body 20 may be set by a person having ordinary skill in the art according to actual requirements. The value of the included angle between the first body 10 and the second body 20 is not specifically limited.

Further, for example, in the second situation, when the second relative position is the position in which the first body 10 and the second body 20 are approximately in the same plane, the included angle between the first body 10 and the second body 20 may be an angle value of 180°, an angle interval of [175°, 185°], or any angle value within the above mentioned angle interval, such as 177°, 179°, 181°, or 182°. Of course, the value of the included angle between the first body 10 and the second body 20 is not limited to the above mentioned angle values and the above mentioned angle interval so long as the first body 10 and the second body 20 are approximately in the same plane. The value of the included angle between the first body 10 and the second body 20 may be set by a person having ordinary skill in the art according to actual requirements. The value of the included angle between the first body 10 and the second body 20 is not specifically limited.

In addition, for the second embodying situation, there may be one or more second relative positions within the entire opening and closing range of the first body 10 and the second body 20. When there is only one second relative position, the second relative position may belong to anyone of the first situation or the second situation. When the second relative position belongs to the first situation, the second relative position can has only one angle value or one angle interval. When there are a plurality of second relative positions, these second relative positions may be discretely distributed in the entire opening and closing range, and the second relative positions may belong to the first situation, the second situation, or a combination of the first situation and the second situation. For example, when the entire opening and closing range of the first body 10 and the second body 20 is [0°, 360°] and the second relative positions belong to the combination of the first situation and the second situation, the included angles corresponding to the second relative positions may be {90°, 180°, 270°}, [85°, 95]∩[175°, 185]∩[265°, 275°], or a set of three angle values constituted by optionally selecting one value from each of the subintervals of the above mentioned interval, such as {91°, 179°, 272°}. When the second relative positions belong to the combination of the first situation and the second situation, the included angles corresponding to the second relative positions may be {90°, 270°}, [85°, 95°]∩ [265°, 275°], or a set of two angle values constituted by optionally selecting one value from each of the subintervals of the above mentioned interval, such as {89°, 268°}. Similarly, the value of the included angle between the first body 10 and the second body 20 is not limited to the above mentioned angle values and the above mentioned angle intervals. The value of the included angle between the first body 10 and the second body 20 may be set by a person having ordinary skill in the art according to actual requirements. The value of the included angle between the first body 10 and the second body 20 is not specifically limited.

When the second relative position belongs to the above mentioned situations, the included angle between the first body 10 and the second body 20 corresponding to the first relative position is anyone of all the opening and closing angles of the first body 10 and the second body 20 except the included angle corresponding to the second relative position.

In the above mentioned embodiments, the specific manners in which the first body 10 moves relative to the second body 20 from the first relative position to the second relative position may be divided into a first manner, and a second manner different from the first manner. The first body 10 is decoupled from the second body 20 after the first body 10 moves relative to the second body 20 in the first manner from the first relative position to the second relative position, and the first body 10 is still kept coupled to the second body 20 if the first body 10 moves relative to the second body 20 in the second manner from the first relative position to the second relative position.

For example, take a rotary cover type electronic apparatus for example, i.e., the first body 10 is coupled to the second body 20 through two shafts disposed in different directions. A shaft A of the two shafts is disposed perpendicular to a bottom side of the first body 10, and a shaft B of the two shafts is disposed parallel to the bottom side of the first body 10. In this way, when a user pushes the first body 10 such that it moves to the second relative position through the shaft B, i.e., moves to the second relative position in the first manner, the first coupling member 101 can be decoupled from the second coupling member 201, i.e., an engagement mechanism in an engagement opening does not engage with an engagement hook, so that the first body 10 can also be decoupled from the second body 20. However, if the user pushes the first body 10 such that it moves to the second relative position through the shaft A, i.e., moves to the second relative position in the second manner, the first coupling member 101 cannot be decoupled from the second coupling member 201, i.e., the engagement mechanism in the engagement opening does not move and still engages with the engagement hook, so that the first body 10 cannot be decoupled from the second body 20 either, i.e., the first body 10 is kept coupled to the second body 20. Of course, the first body 10 may also move to the second relative position in another first manner, i.e., rotate to the second relative position through the shaft, and may also move to the second relative position in another second manner, i.e., slide to the second relative position through a slide way. In this way, only when the first body 10 rotates to the second relative position through the shaft, the first coupling member 101 can be decoupled from the second coupling member 201. When the first body 10 slides to the second relative position through the slide way, the first coupling member 101 cannot be decoupled from the second coupling member 201. In practical application, the first manner and the second manner can be achieved in many other ways. The first manner and the second manner are not specifically limited.

Further, movement of the first body 10 relative to the second body 20 from the first relative position to the second relative position in the first manner may be embodied in the following two embodying situations.

In the first embodying situation, after the first body 10 moves relative to the second body 20 in the first manner from the first relative position to the second relative position, the N first coupling members 101 switch from a first state to a second state different from the first state, and are decoupled from the N second coupling members 201 so that the first body 10 is decoupled from the second body 20.

Figure 3A:
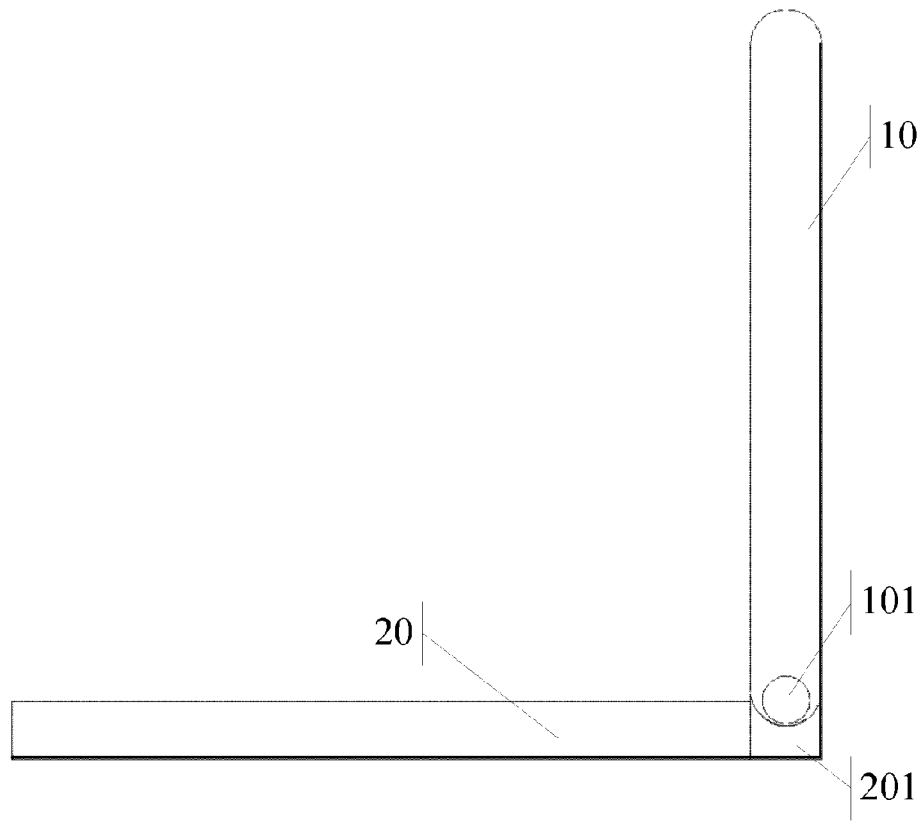
FIGS. 3A-3B are schematic views showing a structure for achieving movement in a first manner in the first embodiment of the present invention.

Specifically, as shown in FIG. 3A, when the first coupling member 101 and the second coupling member 201 are magnetic force members, the first coupling member 101 is an electromagnet and the second coupling member 201 may also be an electromagnet, for example. When the first body 10 and the second body 20 are in the first relative position, the first coupling member 101 may have a first polarity, while the second coupling member 201 may have a second polarity. For example, the first polarity is the N pole and the second polarity is the S pole, or the first polarity is the S pole and the second polarity is the N pole. In this case, the first coupling member 101 attracts the second coupling member 201 so that they adhere to each other, i.e., the first coupling member 101 is coupled with the second coupling member 201. Next, the first body 10 moves to the second relative position in the first manner. In this case, a user may press a mechanical switch or an electronic switch. Alternatively, the first body 10 is provided with an angle sensor for detecting the included angle between the first body 10 and the second body 20. When the included angle reaches a preset angle, i.e., the first body 10 moves relative to the second body 20 to the second relative position, the electronic apparatus controls, according to the user's above mentioned triggering operation, the polarity of the first coupling member 101 to change such that the polarity of the first coupling member 101 is switched from the first polarity to the second polarity, for example from the N pole to the S pole, or from the S pole to the N pole. As a result, the first coupling member 101 cannot attract the second coupling member 201 so that they cannot adhere to each other. In other words, the first coupling member 101 is decoupled from the second coupling member 201 so that the first body 10 is decoupled from the second body 20.

For a situation where there are a plurality of second relative positions in the opening and closing range of the first body 10 and the second body 20, for example, two second relative positions which are a second relative position A and a second relative position B, respectively, when the first body 10 first moves relative to the second body 20 to the second relative position A, change in the polarity of the first coupling member 101 is triggered such that the first coupling member 101 cannot attract the second coupling member 201 so that they cannot adhere to each other, i.e., the first coupling member 101 is decoupled from the second coupling member 201. In this case, however, if the first body 10 is not subjected to the above mentioned first force, the first body 10 will not be separated from the second body 20. Next, the first body 10 continues to move relative to the second body 20 until the first body 10 moves to the second relative position B. In this case, change in the polarity of the first coupling member 101 is again triggered such that the first coupling member 101 is decoupled from the second coupling member 201. In this case, if the first body 10 is subjected to the above mentioned first force, the first body 10 can be separated from the second body 20.

Of course, if there are a plurality of second relative positions in the opening and closing range of the first body 10 and the second body 20, the above mentioned process may also be achieved by any other mechanism such as a cam. When the first body 10 first moves relative to the second body 20 to the second relative position A, the cam is in a completely disengaged state so that the first coupling member 101 is decoupled from the second coupling member 201 connected to the cam. In this case, however, if the first body 10 is not subjected to the above mentioned first force, the first body 10 will not be separated from the second body 20. Next, the first body 10 continues to move relative to the second body 20 until the first body 10 moves to the second relative position B. In this case, the cam switches from the completely disengaged state to a completely engaged state, and switches from the completely engaged state to the completely disengaged state again. In this way, the first coupling member 101 is again decoupled from the second coupling member 201. If the first body 10 is subjected to the above mentioned first force, the first body 10 can be separated from the second body 20.

Figure 3B:
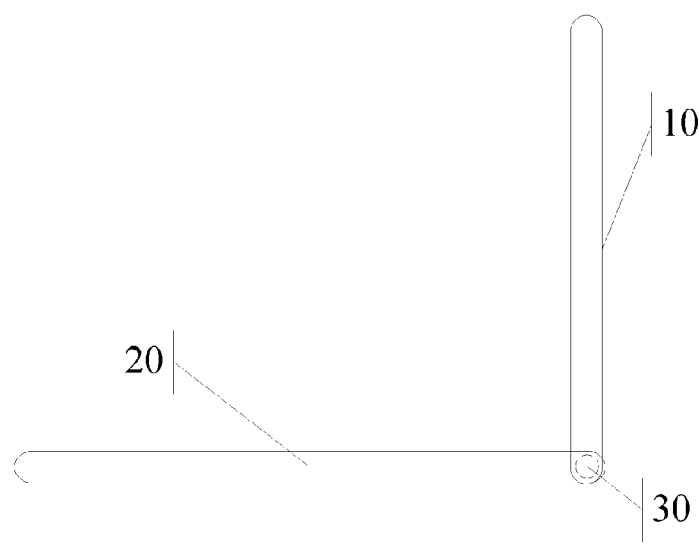

In the second embodying situation, as shown in FIG. 3B, the second body 20 further comprises a shaft 30, and the shaft 30 is disposed on a first side of the N second coupling members 201 so that when the first body 10 and the second body 20 are kept in contact with each other, the first body 10 can rotate relative to the second body 20 around the shaft 30 from the first relative position to the second relative position. As a result, the first body 10 is decoupled from the second body 20.

Specifically, the second body 20 further comprises the shaft 30, and the shaft 30 is disposed on the first side of the second coupling members 201. In other words, the shaft 30 is disposed on a side close to the second body 20 to be parallel to a side where the first body 10 and the second body 20 contact. Of course, the shaft 30 may also be disposed on a side away from the second body 20 to be parallel to the side where the first body 10 and the second body 20 contact. In this way, when the first body 10 and the second body 20 are kept in contact with each other, the first body 10 can rotate relative to the second body 20 around the shaft 30 from the first relative position to the second relative position.

In another embodiment, in the solution as shown in FIG. 1, the second body 20 may also comprise the shaft 30 so that when the first body 10 and the second body 20 are kept in contact with each other, the first body 10 can rotate relative to the second body 20 around the shaft 30 from the first relative position to the second relative position.

Furthermore, on the basis of the second embodying situation corresponding to FIG. 3B, if a user inserts the N second coupling members 201 of the second body 20 such as engagement hooks (on the assumption that N=2) into the corresponding two first coupling members of the first body 10 such as engagement openings when the first body 10 and the second body 20 are in the first relative position, the engagement openings engage with the engagement hooks. Thereby, the first body 10 is coupled to the second body 20. Next, the first body 10 moves relative to the second body until the first body 10 moves to the second relative position. In this case, in order to decouple the first coupling member 101 from the second coupling member 201, there may be two manners. In a first manner of the two manners, when the first body 10 and the second body 20 are in the second relative position, a user may press a mechanical switch or an electronic switch. In this case, the switch can decouple the first coupling member 101 from the second coupling member 201. In a second manner of the two manners, the first coupling member 101 is decoupled from the second coupling member 201 by interaction between mechanical structures in a continuous process. The specific mechanical structures will be described in detail in the following embodiments.

Further, when the first body 10 and the second body 20 can continuously rotate through the shaft 30 from the first relative position through at least one transition position included between the first relative position and the second relative position to the second relative position, the first body 10 is decoupled from the second body 20 so that the first body 10 is separable from the second body 20, which corresponds to the second manner.

Specifically, when the process in which the first body 10 rotates around the shaft 30 from the first relative position to the second relative position is a continuous process, for example, in a process in which the first body 10 rotates from the first relative position (i.e. a relative position where the included angle between the first body and the second body is) 30° to the second relative position (i.e. a relative position where the included angle between the first body 10 and the second body 20 is 90°), the first body 10 will rotate through at least one transition position, i.e. relative positions such as those where the included angles between the first body 10 and the second body 20 are 45°, 60°, and 89°. In these transition positions, the first body 10 and the second body 20 can be kept stable in the transition position. Only the rotation through these transition positions is regarded as an effective rotation and can enable the first coupling member 101 to be decoupled from the second coupling member 201, so that the first body 10 is decoupled from the second body 20. If the first body 10 rotates directly to the second relative position without passing through the at least one relative position, the rotation is regarded as an ineffective rotation. As a result, the first coupling member 101 cannot be decoupled from the second coupling member 201 so that the first body 10 cannot be decoupled from the second body 20.

Figure 4:
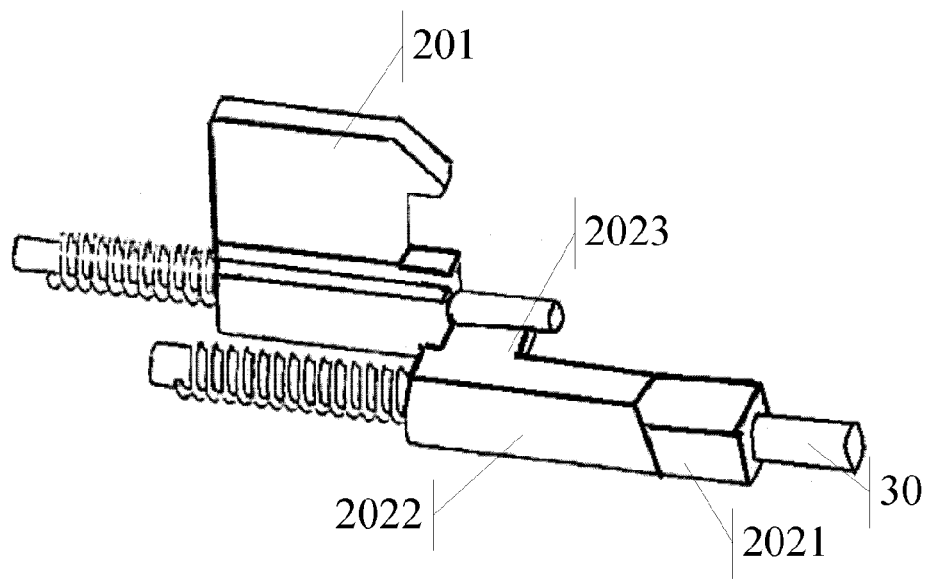
FIG. 4 is a schematic view showing a structure of a first cam in the first embodiment of the present invention.

Furthermore, as shown in FIG. 4, the second body 20 further comprises a first cam fitted over the shaft 30. The first cam comprises: a first engagement member 2021; a second engagement member 2022; and a linkage member 2023 disposed to the second engagement member 2022 to be capable of being separably connected to the second coupling member 201. During rotation of the first body 10 relative to the second body 20 from the first relative position to the second relative position, the first engagement member 2021 rotates relative to the second engagement member 2022 from a first position to a second position, such that the second engagement member 2022 slides relative to the shaft 30 in a first direction and drives the second coupling member 201 to slide in the first direction through the linkage member 2023, so that the first coupling member 101 is decoupled from the second coupling member 201, and thus the first body 10 is separable from the second body 20.

Figure 5A:
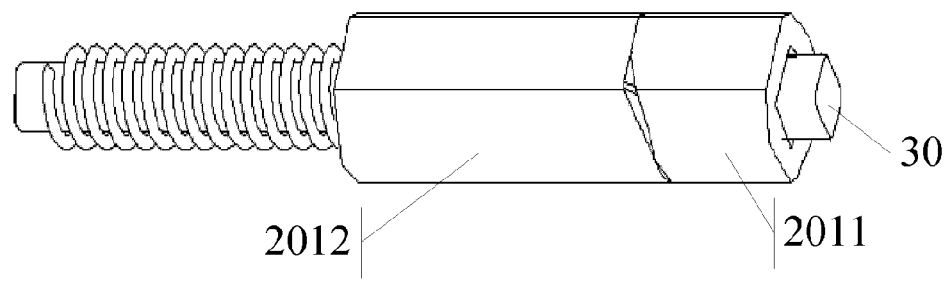
FIGS. 5A-5B are schematic views showing position relationships between a first engagement member and a second engagement member in the first embodiment of the present invention.
Figure 5B:
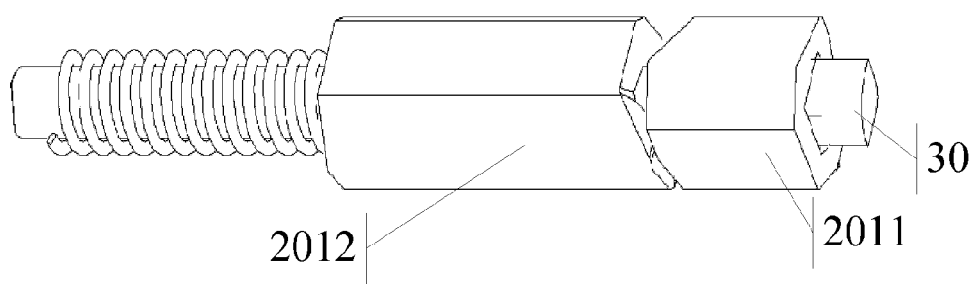

Specifically, during rotation of the first body 10 around the shaft 30 from the first relative position to the second relative position, the first engagement member 2021 rotates relative to the second engagement member 2022 from the first position as shown in FIG. 5A to the second position as shown in FIG. 5B, i.e. the first engagement member 2021 and the second engagement member 2022 switch from the completely engaged state to the completely disengaged state. In this case, the second engagement member 2022 slides in a direction away from the first engagement member 2021, i.e. the first direction, so that the second engagement member 2022 is moved about 2-2.5 mm relative to the shaft 30. Of course, the second engagement member 2022 may be moved 1-3 mm relative to the shaft 30. Since the linkage member 2023 is disposed to the second engagement member 2022 and is separably connected to the second coupling member 201. In this way, when the second engagement member 2022 slides, it will drive the second coupling member 201 to also slide in the first direction through the linkage member 2023. In this case, the second coupling member 201 is decoupled from the first coupling member 101, and thus the first body 10 is separable from the second body 20.

In practical application, a specific value of a distance moved by the second engagement member 2022 relative to the shaft 30 is determined by the structures of the first engagement member 2021 and the second engagement member 2022. Therefore, the specific value of the distance may be set by a person having ordinary skill in the art in the specific embodying process according to the specific situation. The specific value of the distance is not specifically limited.

In a specific embodying process, the first engagement member 2021 may comprise a first end provided with at least two recesses, and the second engagement member 2022 comprises a second end and a third end different from the second end. The second end is provided with at least two protrusions 20221 mated with the at least two recesses, and the linkage member 2023 is disposed to the third end. When the first engagement member 2021 is in the first position relative to the second engagement member 2022, the at least two recesses and the at least two protrusions 20221 are in a first state; and when the first engagement member 2021 is in the second position relative to the second engagement member 2022, the at least two recesses and the at least two protrusions 20221 are in a second state different from the first state.

Figure 6:
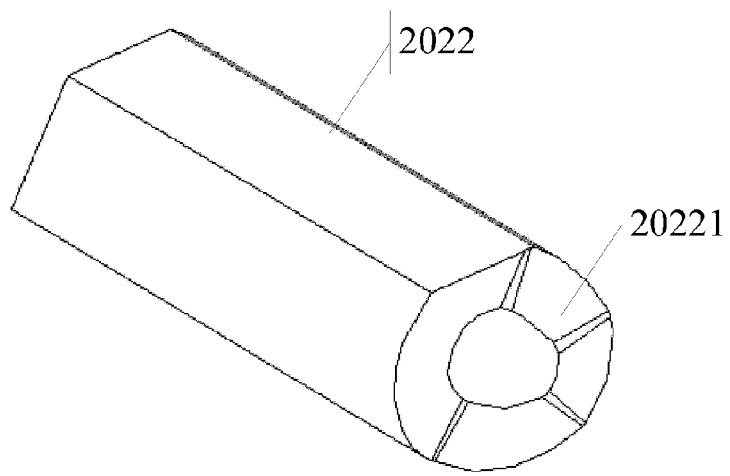
FIG. 6 is a schematic view showing a structure of a contact surface of the second engagement member with the first engagement member in the first embodiment of the present invention.

Specifically, the first end 401 of the first engagement member 2021 is provided with the at least two recesses, and the second end of the second engagement member 2022 is provided with the at least two protrusions 20221 mated with the at least two recesses. When the at least two protrusions 20221 is configured as shown in FIG. 6, the first engagement member 2021 and the second engagement member 2022 can switch gradually from the completely engaged state, i.e. the first state, to the completely disengaged state, i.e. the second state, along surfaces of the at least two recesses during rotation of the first engagement member 2021 relative to the second engagement member 2022. Of course, the at least two recesses may also have other structure so long as the first engagement member 2021 and the second engagement member 2022 can switch gradually from the completely engaged state to the completely disengaged state during rotation of the first engagement member 2021 relative to the second engagement member 2022. The structure of the at least two recesses is not specifically limited.

Of course, the second state may also be a partly engaged state so long as the second engagement member 2022 can slide relative to the shaft 30 in the first direction by cooperation between the at least two recesses and the at least two protrusions 20221.

In another embodiment, still as shown in FIG. 4, in order to keep the second coupling member 201 and the linkage member 2023 in close contact with each other, an elastic member is disposed on the shaft 30 to be connected to the third end of the second engagement member 2022, and an elastic member is also disposed on a side of the second coupling member 201. In this way, when the linkage member 2023 drives the second coupling member 201 to move, the two elastic members can bring the linkage member 2023 and the second coupling member 201 in close contact with each other.

Furthermore, in order to improve user experience such that a user can separate the first body 10 from the second body 20 without needing to exert a force, the second body 20 further comprises a force application mechanism, and the force application mechanism is configured to provide a first force to the first body 10 such that the first body 10 is decoupled and separated from the second body 20, when the first body 10 and the second body 20 are in the second relative position. In practical application, the force application mechanism may be specifically a mechanism such as a spring or a scissor. The force application mechanism is not specifically limited.

The operational process of the electronic apparatus will be described in detail as below.

Figure 7A:
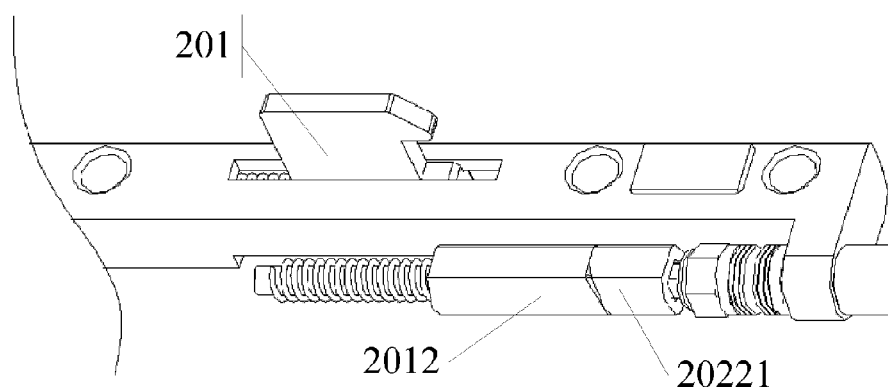
FIGS. 7A-7B are schematic views showing states of the first cam when the first body and the second body are in different relative positions in the first embodiment of the present invention.
Figure 7B:
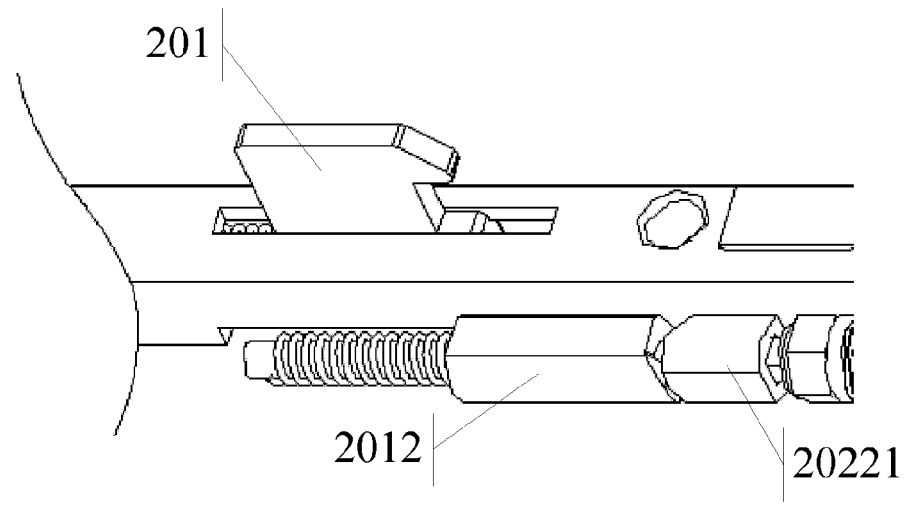

When a user wants to couple the first body 10 to the second body 20, the user aligns the N first coupling members 101 with the second coupling members 201 and then inserts the second coupling members 201 into the first coupling members 101. After the first coupling members 101 are coupled to the second coupling members 201, the first body 10 and the second body 20 are in the first relative position as shown in FIG. 7A (in which other functional parts on the left side of the curve are omitted). Further, the user can optionally adjust an angle between the first body 10 and the second body 20 in use. All of these relative positions between the first body 10 and the second body 20 can be regarded as the first relative positions. Then, when the user wants to take the first body 10 from the second body 20, he rotates the first body 10 relative to the second body 20. In this case, with the rotation of the first body 10, the second coupling member 201 will drive the second engagement member 2022 to rotate around the shaft 30. In the subsequent rotation process, the first engagement member 2021 will rotate relative to the second engagement member 2022 and will slowly press the second engagement member 2022 along contact surfaces of the two engagement members in the first direction, so that the second engagement member 2022 is moved a distance along the shaft 30 in the first direction, while the linkage member 2023 disposed to the second engagement member 2022 drives the second coupling member 201 to slide also in the first direction. When the first body 10 and the second body 20 reach the second relative position, the first engagement member 2021 is completely disengaged from the second engagement member 2022. In other words, the first engagement member 2021 presses the second engagement member 2022 to the maximum extent, and the second coupling member 201 is also driven to be moved relative to the first coupling members 101 to the maximum extent by the linkage member 2023 to be decoupled from the first coupling members 101 as shown in FIG. 7B (in which other functional parts on the left side of the curve are omitted). In this case, if the user applies the first force to the first body 10, he can easily pull out the first body 10 from the second body 20. Of course, the first body 10 may also be ejected by the force application mechanism. In this way, the user can pull out the first body 10 from the second body 20 without applying a force.

Thus, the coupling and separation of the first body 10 with and from the second body 20 of the electronic apparatus are completed.

As known from the above description, when the first body and the second body are kept in contact with each other, the first body can be coupled to the second body to be integrated by cooperation of the N first coupling members and the N second coupling members if the first body and the second body are in the first relative position. In this case, even if the first force away from the second body is applied to the first body, the first body cannot be separated from the second body. However, when the first body and the second body are in the second relative position, the first body is decoupled from the second body but the first body and the second body are still kept in contact with each other by cooperation of the N first coupling members and the N second coupling members. In this case, if the above mentioned first force is applied to the first body, the first body will be separated from the second body. Therefore, when a user separates the first body from the second body, he need not apply a large force but he only needs to adjust the relative position of the first body and the second body to the second relative position and thereby he can easily separate the first body from the second body. Thereby, the lift time of the electronic apparatus is lengthened. Furthermore, since a user can easily separate the first body from the second body with a less force, the present invention provides an excellent user experience. Furthermore, the first body can move relative to the second body in the first manner and the second manner different from the first manner. The first body is decoupled from the second body when the first body moves relative to the second body in the first manner from the first relative position to the second relative position, and the first body is still kept coupled to the second body when the first body moves relative to the second body in the second manner from the first relative position to the second relative position. In other words, the first body and the second body can be adjusted from the first relative position to the second relative position in many manners. However, only if the first body moves in the first manner, can the first body be decoupled and further separated from the second body when the first body and the second body are in the second relative position. When the first body moves in the second manner such that the first body and the second body are in the second relative position, the first body is still kept coupled to and integrated with the second body. In this way, the reliability of coupling between the first body and the second body is enhanced so that when a user moves the first body in the second manner, he need not worry that the first body may be separated from the second body so that his operation will be affected, thereby improving user experience. When the first body and the second body can continuously rotate through the shaft from the first relative position through at least one transition position included between the first relative position and the second relative position to the second relative position, the first body is decoupled from the second body so that the first body is separable from the second body. In other words, only if the first body and the second body are subjected to the continuous rotation process, can the first body be decoupled and further separated from the second body. If the first body and the second body are not subjected to the continuous rotation, but they are adjusted directly from the first relative position to the second relative position, the first body is still kept coupled to and inseparable from the second body. In this way, the reliability of coupling between the first body and the second body of the electronic apparatus is enhanced, thereby improving user experience.

Figure 8:
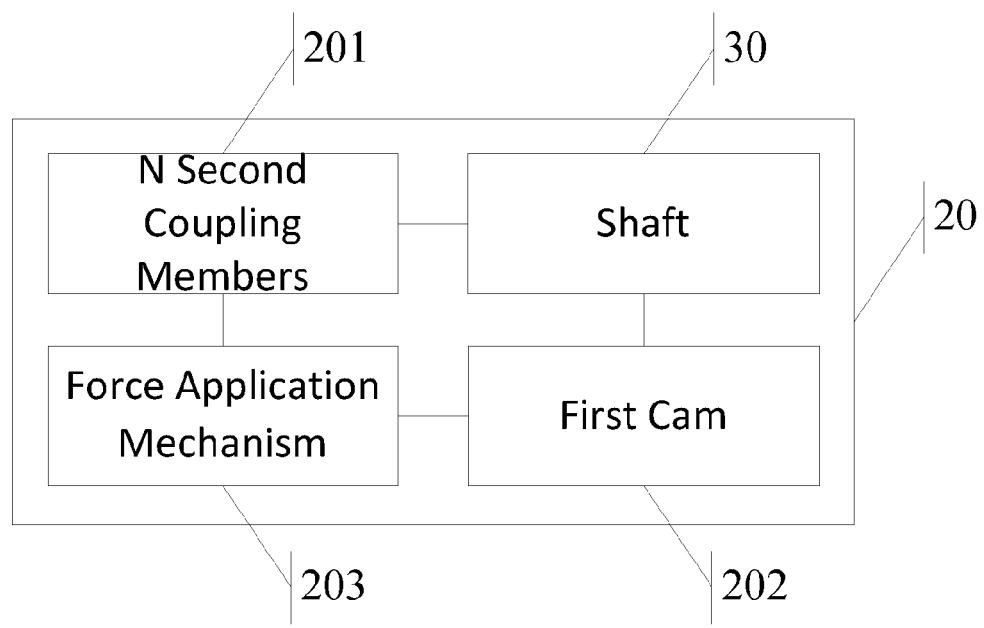
FIG. 8 is a schematic diagram showing a structure of a docking station according to the first embodiment of the present invention.
Figure 9:
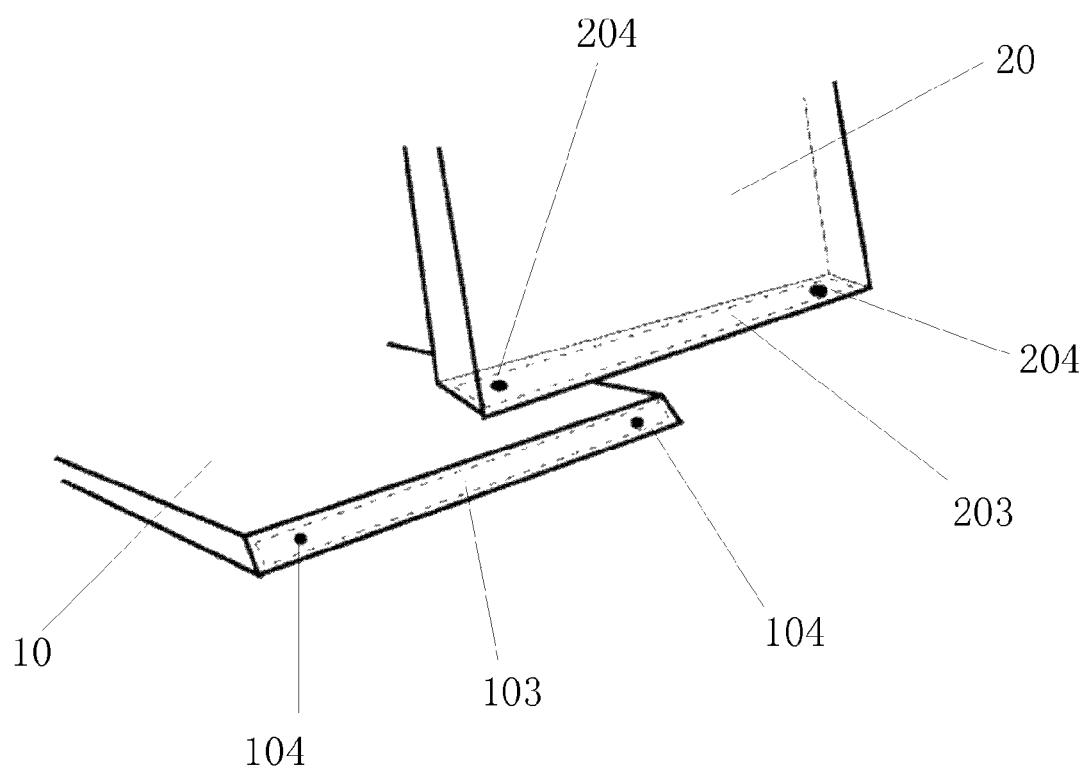
FIG. 9 is a schematic view showing a structure of an electronic apparatus according to a second embodiment of the present invention.
Figure 10:
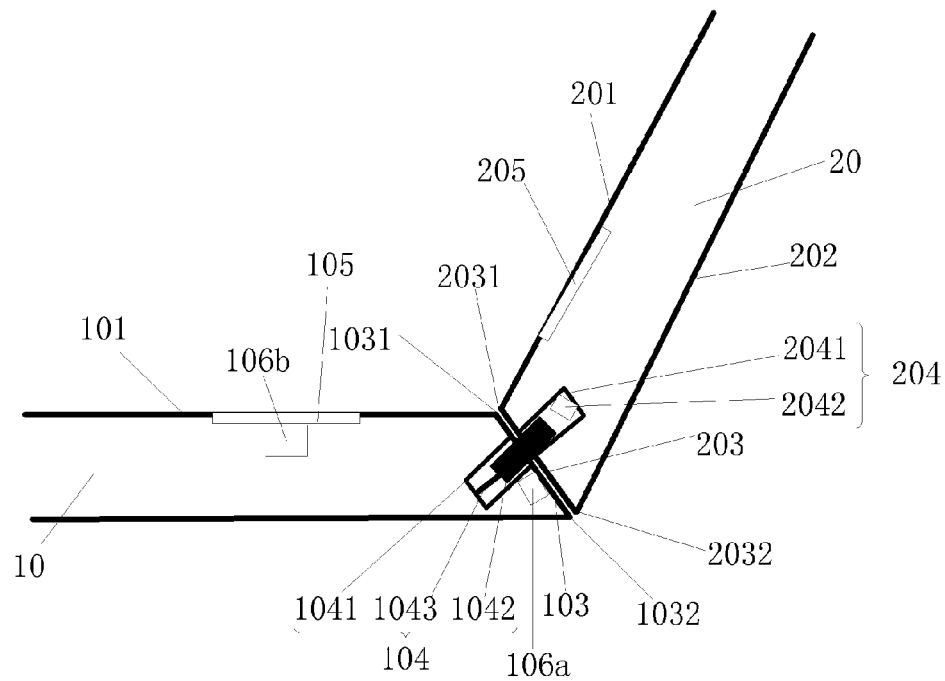
FIG. 10 is a schematic side view of a first body and a second body in a first relative position in the second embodiment of the present invention.
Figure 11:
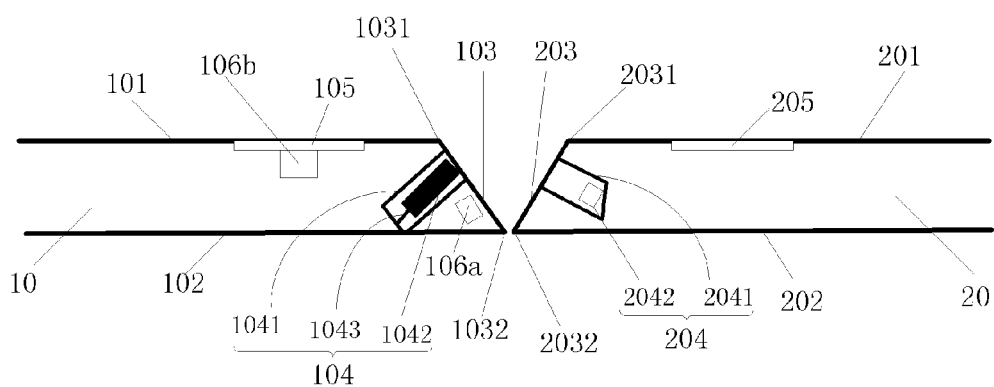
FIG. 11 is a schematic side view of the first body and the second body in a second relative position in the second embodiment of the present invention.
Figure 12:
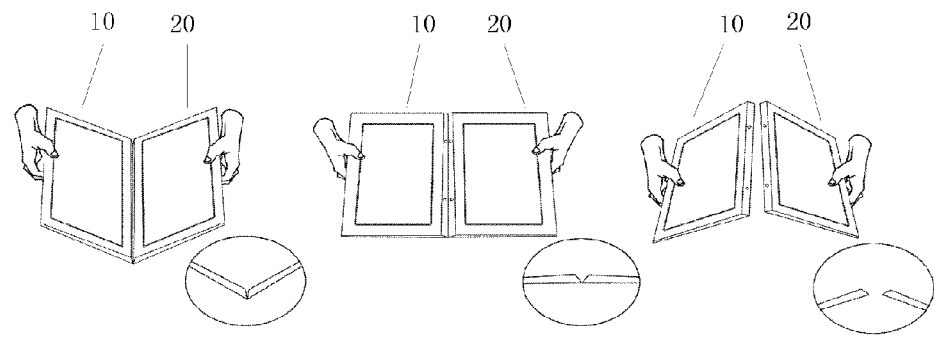
FIG. 12 is a demonstration view showing a process in which the first body is separated from the second body from a state where the first body and the second body are in the first relative position and coupled to each other in the second embodiment of the present invention.
Figure 13:
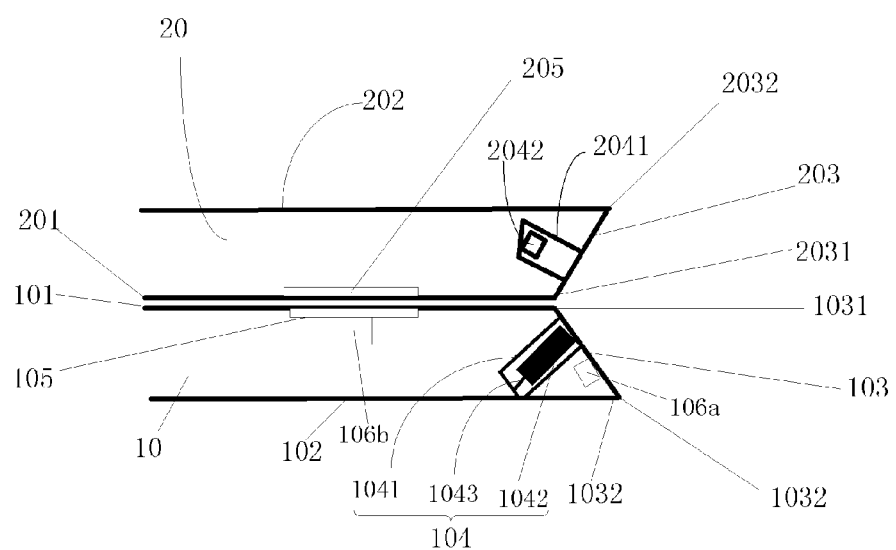
FIG. 13 is a schematic side view of the first body and the second body in a third relative position in the second embodiment of the present invention.
Figure 14:
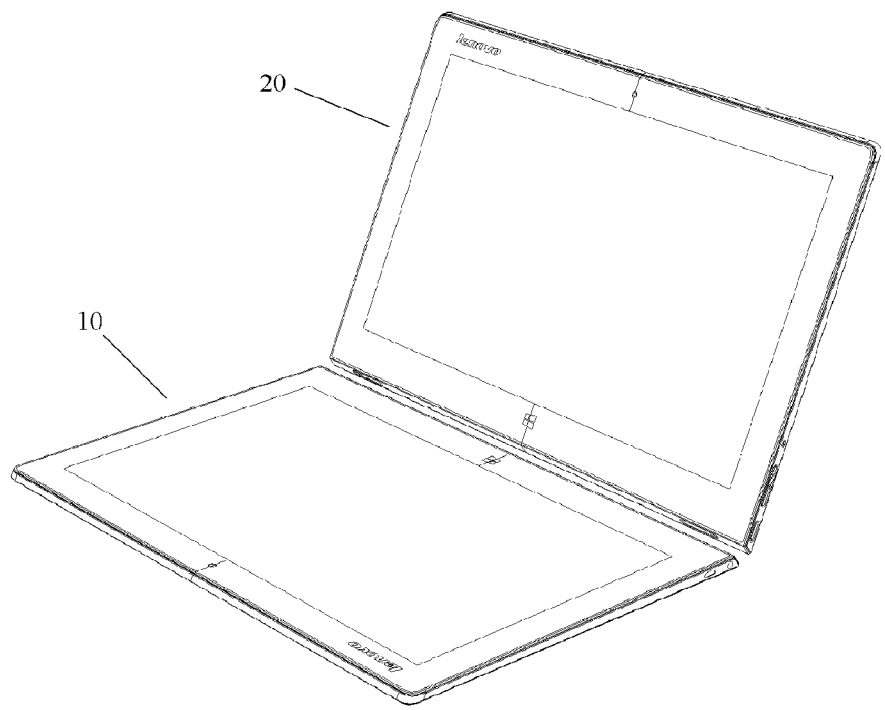
FIG. 14 is a schematic perspective view of the first body and the second body in a first mode in the second embodiment of the present invention.
Figure 15:
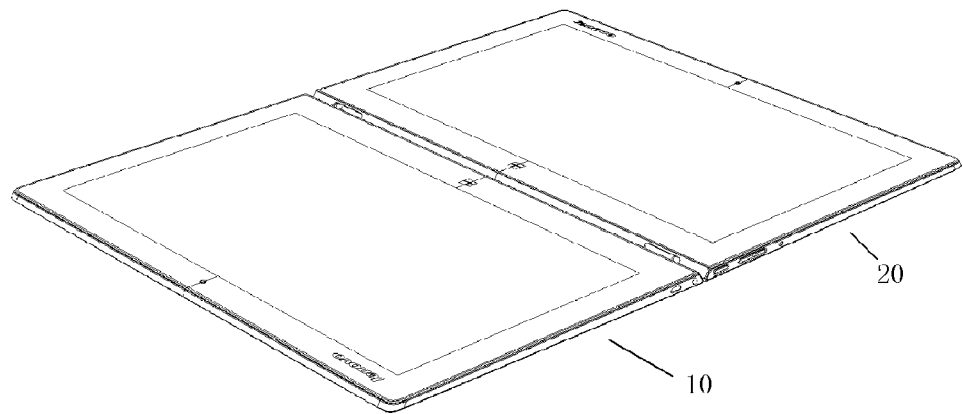
FIG. 15 is a schematic perspective view of the first body and the second body in a second mode in the second embodiment of the present invention.

In accordance with another aspect of the present invention, based on the same inventive concept, the present invention provides a docking station which can be separably connected to an electronic apparatus. The docking station is consistent with the above mentioned second body 20, while the electronic apparatus is consistent with the above mentioned first body 10. The docking station can also serve as an input device of the electronic apparatus. The electronic apparatus is provided with N first coupling members, where N is an integer greater than or equal to 1. As shown in FIG. 8, the docking station includes N second coupling members 201 mated with the N first coupling members. When the electronic apparatus and the docking station are kept in contact with each other, the electronic apparatus is coupled to the docking station by cooperation of the N first coupling members and the N second coupling members 201 if the electronic apparatus and the docking station are in a first relative position, and the electronic apparatus is decoupled from the docking station so that the electronic apparatus is separable from the docking station by cooperation of the N first coupling members and the N second coupling members 201 if the electronic apparatus and the docking station are in a second relative position different from the first relative position.

Further, the electronic apparatus can move relative to the docking station in a first manner and a second manner different from the first manner. The electronic apparatus is decoupled from the docking station when the electronic apparatus moves relative to the docking station in the first manner from the first relative position to the second relative position, and the electronic apparatus is still kept coupled to the docking station when the electronic apparatus moves relative to the docking station in the second manner from the first relative position to the second relative position.

In addition, when the electronic apparatus moves relative to the docking station in the first manner from the first relative position to the second relative position, the N first coupling members switch from a first state to a second state different from the first state, and are decoupled from the N second coupling members 201 so that the electronic apparatus is decoupled from the docking station.

Furthermore, as shown in FIG. 8, the docking station further comprises a shaft 30, and the shaft is disposed on a first side of the N second coupling members 201 so that when the electronic apparatus and the docking station are kept in contact with each other, the electronic apparatus can rotate relative to the docking station around the shaft from the first relative position to the second relative position.

Further, when the electronic apparatus and the docking station can continuously rotate through the shaft 30 from the first relative position through at least one transition position included between the first relative position and the second relative position to the second relative position, the electronic apparatus is decoupled from the docking station so that the electronic apparatus is separable from the docking station.

Further, as shown in FIG. 4, the docking station further comprises a first cam 202 fitted over the shaft 30, and the first cam 202 comprises: a first engagement member 2021; a second engagement member 2022; and a linkage member 2023 disposed to the second engagement member 2022 to be capable of being separably connected to the second coupling member 201. During rotation of the electronic apparatus relative to the docking station from the first relative position to the second relative position, the first engagement member 2021 rotates relative to the second engagement member 2022 from a first position to a second position, such that the second engagement member 2022 slides relative to the shaft in a first direction and drives the second coupling member 201 to slide in the first direction through the linkage member 2023, so that the first coupling member 101 is decoupled from the second coupling member 201, and thus the electronic apparatus is separable from the docking station.

In addition, the first engagement member 2021 comprises a first end provided with at least two recesses; and the second engagement member 2022 comprises a second end and a third end different from the second end. The second end is provided with at least two protrusions mated with the at least two recesses, and the linkage member 2023 is disposed to the third end. When the first engagement member 2021 is in the first position relative to the second engagement member 2022, the at least two recesses and the at least two protrusions are in a first state; and when the first engagement member 2021 is in the second position relative to the second engagement member 2022, the at least two recesses and the at least two protrusions are in a second state different from the first state.

Moreover, the docking station further comprises a force application mechanism 203, and the force application mechanism is configured to provide a first force to the electronic apparatus such that the electronic apparatus is decoupled and separated from the docking station, when the electronic apparatus and the docking station are in the second relative position.

The operational process of the docking station and the electronic apparatus is the same as that of the second body 20 and the first body 10 and are no longer described here one by one for the sake of brevity.

The technical solutions in the above first embodiment of the present application have at least the following technical effects or advantages.

1. When the first body and the second body are kept in contact with each other, the first body can be coupled to the second body to be integrated by cooperation of the N first coupling members and the N second coupling members if the first body and the second body are in the first relative position. In this case, even if the first force away from the second body is applied to the first body, the first body cannot be separated from the second body. However, when the first body and the second body are in the second relative position, the first body is decoupled from the second body but the first body and the second body are still kept in contact with each other by cooperation of the N first coupling members and the N second coupling members. In this case, if the above mentioned first force is applied to the first body, the first body will be separated from the second body. Therefore, when a user separates the first body from the second body, he need not apply a large force but he only needs to adjust the relative position of the first body and the second body to the second relative position and thereby he can easily separate the first body from the second body. As a result, the present invention effectively solves the technical problem existing conventionally that the electronic apparatus is damaged because it cannot sustain the excessive force applied by the user to the auxiliary device during separating the electronic apparatus from the auxiliary device since the electronic apparatus is coupled to the auxiliary device by the spring and the engagement mechanism, thereby lengthening the lift time of the electronic apparatus. Furthermore, since a user can easily separate the first body from the second body with a less force, the present invention provides an excellent user experience.

2. The first body can move relative to the second body in the first manner and the second manner different from the first manner. The first body is decoupled from the second body when the first body moves relative to the second body in the first manner from the first relative position to the second relative position, and the first body is still kept coupled to the second body when the first body moves relative to the second body in the second manner from the first relative position to the second relative position. In other words, the first body and the second body can be adjusted from the first relative position to the second relative position in many manners. However, only if the first body moves in the first manner, can the first body be decoupled and further separated from the second body when the first body and the second body are in the second relative position. When the first body moves in the second manner such that the first body and the second body are in the second relative position, the first body is still kept coupled to and integrated with the second body. In this way, the reliability of coupling between the first body and the second body is enhanced so that when a user moves the first body in the second manner, he need not worry that the first body may be separated from the second body so that his operation will be affected, thereby improving user experience.

3. When the first body and the second body can continuously rotate through the shaft from the first relative position through at least one transition position included between the first relative position and the second relative position to the second relative position, the first body is decoupled from the second body so that the first body is separable from the second body. In other words, only if the first body and the second body are subjected to the continuous rotation process, can the first body be decoupled and further separated from the second body. If the first body and the second body are not subjected to the continuous rotation, but they are adjusted directly from the first relative position to the second relative position, the first body is still kept coupled to and inseparable from the second body. In this way, the reliability of coupling between the first body and the second body of the electronic apparatus is enhanced, thereby improving user experience.

Embodiment 2

The second embodiment of the present application solves the technical problem that operation of the separable electronic apparatus is complicated during coupling or separation due to its complicated structural design, by providing a coupling device.

In order to solve the above technical problem, the technical solutions in the embodiment of the present application provide the following general concept:

an electronic apparatus comprising:

a first body including N first coupling members, where N is an integer greater than or equal to 1; and a second body including N second coupling members mated with the first coupling members, wherein the first body and the second body have at least a first relative position and a second relative position;

when the first body and the second body are in the first relative position, the first body is coupled to the second body by cooperation of the N first coupling members and the N second coupling members;

when the first body and the second body are in the second relative position, the first body is decoupled from the second body by cooperation of the N first coupling members and the N second coupling members, so that the first body is separated from the second body;

during moving the first body and the second body from the first relative position to the second relative position by means of an external force, the first body rotates on a second edge of the second body as an axis of rotation such that the first body is separated from a first edge of the second body prior to separation of the first body from the second edge of the second body, and/or the second body rotates on a second edge of the first body as an axis of rotation such that the second body is separated from a first edge of the first body prior to separation of the second body from the second edge of the first body.

In order to enable the object, technical solutions and advantages of the embodiments of the present application more apparent, a clear and complete description of the technical solutions in the embodiments will be made as below with reference to embodiments of the present invention taken in conjunction with the accompanying drawings. Apparently, the described embodiments are some of the embodiments of the present application rather than all of the embodiments of the present application. It will be understood by those skilled in the art that modifications to the following embodiments may be made. All of the modifications made without departing from the principles and spirit of the present invention should fall within the protection scope of the present invention.

The term "and/or" in the description is first interpreted. The term "and/or" is only used to describe a correlational relationship between correlational objects to represent that there may be three relationships between the correlational objects. For example, A and/or B may mean three situations, i.e., may mean that A exists separately, A and B exist simultaneously and B exists separately. In addition, the character "/" in the description generally represents that there is an "or" relationship between correlational objects before and after it.

Example 1

As shown in FIG. 1, an electronic apparatus, which may be a combined/separable tablet computer, comprises:

a first body 10 including N first coupling members 104, where N is an integer greater than or equal to 1; and a second body 20 including N second coupling members 204 mated with the first coupling members 104.

As shown in FIGS. 2 and 3, the first body 10 and the second body 20 have at least a first relative position and a second relative position. In FIG. 2, the first body 10 and the second body 20 are in the first relative position, while in FIG. 3, the first body 10 and the second body 20 are in the second relative position.

The first coupling members 104 and the second coupling members 204 are magnetic coupling members. An enough magnetic attraction force can be generated between the first coupling members 104 and the second coupling members 204 such that the first body 10 and the second body 20 are stably in the first relative position.

As shown in FIG. 2, when the first body 10 and the second body 20 are in the first relative position, the first body 10 is coupled to the second body 20 by cooperation of the N first coupling members 104 and the N second coupling members 204.

As shown in FIG. 3, when the first body 10 and the second body 20 are in the second relative position, the first body 10 is decoupled from the second body 20 by cooperation of the N first coupling members 104 and the N second coupling members 204, so that the first body 10 is separated from the second body 20.

During moving the first body 10 and the second body 20 from the first relative position to the second relative position by means of an external force, the first body 10 rotates on a second edge 2032 of the second body as an axis of rotation such that the first body 10 is separated from a first edge 2031 of the second body prior to separation of the first body 10 from the second edge 2032 of the second body, and/or the second body 20 rotates on a second edge 1032 of the first body as an axis of rotation such that the second body 20 is separated from a first edge 1031 of the first body prior to separation of the second body 20 from the second edge 1032 of the first body.

A user can couple or separate the first body to or from the second body through the N first coupling members and the N second coupling members by a simple rotational operation. Therefore, the present invention effectively solves the technical problems that operation of the separable electronic apparatus is complicated during coupling or separation due to its complicated structural design, thereby achieving the technical effects of coupling or separating the two bodies of the electronic apparatus conveniently and quickly.

In a specific embodying process, the first body 10 may be a keyboard base of the combined/separable tablet computer, while the second body 20 may be a tablet computer portion of the combined/separable tablet computer; or both the first body 10 and the second body 20 are tablet computers, and the two tablet computers have the first relative position and the second relative position by means of the N first coupling members 104 and the N second coupling members 204.

Further, as shown in FIGS. 2 and 3, the first body 10 further comprises:

a first front surface 101;

a first back surface 102 approximately parallel to the first front surface 101;

a first side surface 103 which connects the first front surface 101 and the first back surface 102 and to which the N first coupling members 104 are disposed, wherein the first edge 1031 of the first body is a boundary line between the first front surface 101 and the first side surface 103, the second edge 1032 of the first body is a boundary line between the first back surface 102 and the first side surface 103, the first front surface 101 forms a first angle with the first side surface 103, the first back surface 102 forms a second angle with the first side surface 103, the first angle is greater than 90 degrees, and the second angle is less than 90 degrees. In other words, the first side surface is an inclined plane.

Further, as shown in FIGS. 2 and 3, the second body 20 further comprises:

a second front surface 201;

a second back surface 202 approximately parallel to the second front surface 201;

a second side surface 203 which connects the second front surface 201 and the second back surface 202 and to which the N second coupling members 204 are disposed, wherein the first edge 2031 of the second body is a boundary line between the second front surface 201 and the second side surface 203, the second edge 2032 of the second body is a boundary line between the second back surface 202 and the second side surface 203, the second front surface 201 forms the first angle with the second side surface 203, and the second back surface 202 forms the second angle with the second side surface 203. In other words, the second side surface is an inclined plane.

As shown in FIG. 2, when the first body 10 and the second body 20 are in the first relative position, the first side surface 103 and the second side surface 203 are coupled to and just face each other, the first front surface 101 forms a third angle with the second front surface 201, and the third angle is greater than or equal to 90 degrees. When the first body 10 provides a user with a keyboard service and the second body 20 provides the user with a display service, the electronic apparatus simulates an operational mode of a notebook computer by the first body 10 and the second body 20 to satisfy the user's custom of daily using the notebook computer. The user can carry out fast input by utilizing the keyboard service provided by the first body 10.

As shown in FIG. 3, when the first body 10 and the second body 20 are in the second relative position, the first front surface 101 forms a fourth angle with the second front surface 201, the fourth angle is approximately equal to 180 degrees (i.e., the first front surface 101 and the second front surface 201 are approximately in a same plane), and a distance between the second edge 1032 of the first body and the second edge 2032 of the second body is less than or equal to a first preset distance. The first preset distance may be between 1 cm and 3 cm.

Furthermore, the first coupling member 104 has a first magnetic performance, and the second coupling member 204 has a second magnetic performance opposite to the first magnetic performance. When the first body 10 and the second body 20 are in the first relative position, the first body 10 can be coupled to the second body 20 by a magnetic attraction force between the N first coupling members 104 and the N second coupling members 204.

In a specific embodying process, there are the following two situations for the first coupling members 104 and the second coupling members 204.

In the first situation, the first coupling members 104 may also be magnets, and the second coupling members 204 may be iron piece or iron sheets.

In the second situation, as shown in FIG. 2 or 3, the first coupling member 104 specifically comprises:

a first hole 1041 formed in the first side surface 103;

an iron slide bar 1042 disposed in the first hole 1041; and an elastic element 1043 fixed to a hole bottom of the first hole 1041 and connected to the iron slide bar 1042.

In addition, the second coupling member 204 specifically comprises:

a second hole 2041 formed in the second side surface 203 to be mated with the first hole 1041; and a magnet 2042 disposed in the second hole 2041.

As shown in FIG. 4, when the first body 10 and the second body 20 are in the first relative position, the first hole 1041 and the second hole 2041 just face each other, and the iron slide bar 1042 enters into the second hole 2041 under the action of an attraction force of the magnet 2042 to fix the second body 20 so that the first body 10 is stably coupled to the second body 20.

As known from the above description, the first coupling member 104 and the second coupling member 204 adopt the magnetic attraction force. When the first body 10 and the second body 20 are in the first relative position, the magnet hidden in the second coupling member 204 can attract the iron slide bar 1042, located in the first coupling member 104, into the second hole 2041 of the second coupling member 204 to couple the first body 10 to the second body 20. The first coupling member 104 and the second coupling member 204 not only function to couple the first body to the second body, but they also function to support the second body 20 so that the second body 20 is stably in the first relative position. Therefore, the present invention achieves the technical effects that the coupling process is simple and the coupling is firm.

In addition, the first body 10 and the second body 20 can be freely switched between the first relative position and the second relative position under the action of an external force.

A1. During moving the first body 10 and the second body 20 from the first relative position to the second relative position by means of an external force, the second body 20 rotates clockwise on the second edge 1032 of the first body as an axis of rotation such that a distance between the first edge 2031 of the second body and the first edge 1031 of the first body is greater than a second preset distance, and/or the angle between the first front surface 101 and the second front surface 201 is greater than a first preset angle (the first preset angle is greater than the third angle and less than the fourth angle). In this case, the attraction force applied by the magnet 2042 to the iron slide bar 1042 is released, and the elastic element 1043 pulls the iron slide bar 1042 back into the first hole 1041, so that the first body 10 is separated from the second body 20. After the first front surface 101 forms the first preset angle with the second front surface 201, the external force may continue to be applied to the first body 10 and the second body 20 such that the first front surface 101 forms an angle of approximately 180 degrees with the second front surface 201. In this case, the first body 10 and the second body 20 enter into the second relative position.

B1. During moving the first body 10 and the second body 20 from the second relative position to the first relative position by means of an external force, the second body 20 rotates counterclockwise on the second edge 1032 of the first body as an axis of rotation such that the first edge 2031 of the second body approaches the first edge 1031 of the first body. When the distance between the first edge 2031 of the second body and the first edge 1031 of the first body is less than or equal to the second preset distance, and/or the angle between the first front surface 101 and the second front surface 201 is less than or equal to the first preset angle, the attraction force applied by the magnet 2042 to the iron slide bar 1042 is greater than a pulling force exerted by the elastic element 1043 on the iron slide bar 1042. The iron slide bar 1042 enters into the second hole under the action of the attraction force of the magnet 2042 so that the first body 10 is coupled to the second body 20. Further, the first side surface 103 continues to approach the second side surface 203 to be snug to the second side surface 203. In this case, the first body 10 and the second body 20 are in the first relative position.

In a specific embodying process, as shown in FIG. 4, the first body 10 and the second body 20 can be separated from each other into two independent electronic apparatus.

Moreover, as shown in FIG. 5, the first front surface 101 of the first body 10 is provided with M third coupling members 105 with the first magnetic performance, and the second front surface 201 of the second body 20 is provided with M fourth coupling members 205 with the second magnetic performance, where M is an integer greater than or equal to 1.

As shown in FIG. 4, the first body 10 and the second body 20 further have a third relative position, and when the first body 10 and the second body 20 are in the third relative position, the first front surface 101 and the second front surface 201 are coupled to and just face each other by a magnetic attraction force between the M third coupling members 105 and the M fourth coupling members 205.

In a specific embodying process, the third coupling members 105 may be iron pieces or iron sheets fixed in the first body 10 in the proximity of the first front surface, while the fourth coupling members 205 may be magnets. When the first body 10 and the second body 20 are in the third relative position, the first front surface 101 and the second front surface 201 are coupled to and just face each other by a magnetic attraction force between the third coupling members 105 and the fourth coupling members 205.

The first body 10 and the second body 20 can be freely switched between the first relative position and the third relative position under the action of an external force.

A2. During moving the first body 10 and the second body 20 from the third relative position to the first relative position by means of an external force, the first body 10 rotates counterclockwise on the first edge 2031 of the second body as an axis of rotation such that the first body 10 is coupled to the second edge 2032 of the second body, and/or the second body 20 rotates clockwise on the first edge 1031 of the first body as an axis of rotation such that the second body 20 is coupled to the second edge 1032 of the first body.

In addition, when the first body 10 and the second body 20 are adjusted to move from the third relative position to the first relative position, the magnet 2042 attracts the iron slide bar 1042 such that the iron slide bar 1042 enters into the second hole 2041, so that the first body 10 is stably coupled to the second body 20.

B2. During moving the first body 10 and the second body 20 from the first relative position to the third relative position by means of an external force, the first body 10 rotates counterclockwise on the first edge 2031 of the second body as an axis of rotation such that the first body 10 is separated from the second edge 2032 of the second body and the first front surface 101 and the second front surface 201 are coupled to and just face each other, and/or the second body 20 rotates clockwise on the first edge 1031 of the first body as an axis of rotation such that the second body 20 is separated from the second edge 1032 of the first body and the first front surface 101 and the second front surface 201 are coupled to and just face each other.

In addition, when the first body 10 and the second body 20 are adjusted to move from the first relative position to the third relative position, the attraction force applied by the magnet 2042 to the iron slide bar 1042 is released, and the elastic element 1043 pulls the iron slide bar back into the first hole 1041.

Furthermore, the electronic apparatus further comprises:

a position detection device disposed in the first body 10 and/or the second body 20 for detecting a relative position between the first body 10 and the second body 20.

In a specific embodying process, the position detection device comprises a first position detection module 106a and a second position detection module 106b.

The first position detection module 106a is disposed in the first body 10 for detecting a position of the second coupling member 204. The first position detection module 106a may be a Hall sensor. When the first body 10 and the second body 20 are in the first relative position, the first position detection module 106a can detect a first magnetic field intensity value generated by the second coupling member 204. When the first body 10 and the second body 20 are in the second relative position, the first position detection module 106a can detect a second magnetic field intensity value generated by the second coupling member 204. The second magnetic field intensity value is less than the first magnetic field intensity value.

The second position detection module 106b is disposed in the first body for detecting a position of the fourth coupling member 205. The second position detection module 106b may be a Hall sensor. When the first body 10 and the second body 20 are in the third relative position, the second position detection module 106b can detect a third magnetic field intensity value generated by the fourth coupling member 205.

Furthermore, the electronic apparatus further comprises:

a processor (not shown) disposed in the first body 10 or the second body 20 and connected to the position detection device to control the electronic apparatus to enter into a first mode when the first body 10 and the second body 20 are in the first relative position; and/or control the electronic apparatus to enter into a second mode when the first body 10 and the second body 20 are in the second relative position; and/or control the electronic apparatus to enter into a third mode when the first body 10 and the second body 20 are in the third relative position.

The electronic apparatus can be adjusted by the processor into different modes based on different relative position relationships between the first body and the second body, thereby satisfying user's different requirements.

In a specific embodying process, the processor is connected to the first position detection module 106a and the second position detection module 106b. When the first position detection module 106a detects the first magnetic field intensity value, the processor controls the electronic apparatus (i.e. the first body 10 and the second body 20) to enter into the first mode. When the first position detection module 106a detects the second magnetic field intensity value, the processor controls the electronic apparatus to enter into the second mode. When the second position detection module 106b detects the third magnetic field intensity value, the processor controls the electronic apparatus to enter into the third mode. The first, second, and third modes are three different modes.

Further, the first body 10 further comprises:

a first functional body located in a first accommodation chamber formed by the first front surface, the first side surface and the first back surface; and a first touch screen display unit embedded on the first front surface; and the second body further comprises:

a second functional body located in a second accommodation chamber formed by the second front surface, the second side surface and the second back surface; and a second touch screen display unit embedded on the second front surface.

In a specific embodying process, the first functional body comprises a first hardware system and a first software system operating in the first hardware system; and the second functional body comprises a second hardware system and a second software system operating in the second hardware system. The first and second touch screen display units may be capacitive or resistive touch screens.

Further, as shown in FIG. 6, the first mode is specifically a notebook computer mode, and the notebook computer mode is specifically a mode in which the first body 10 and the second body 20 cooperate in a state where the first functional body simulates a mainframe of a notebook computer, the first touch screen display unit simulates a keyboard and/or a touch pad of the notebook computer, and the second touch screen display unit simulates a display unit of the notebook computer.

In a specific embodying process, both the first body 10 and the second body 20 are tablet computers. The first body 10 simulates the keyboard or the touch pad of the notebook computer, and the second body 20 simulates the display unit of the notebook computer. When a user uses the electronic apparatus in the first relative position, he can achieve fast input through the keyboard as using a common notebook computer.

Further, as shown in FIG. 7, the second mode is specifically a share mode, and the share mode is specifically a mode in which the first touch screen display unit and the second touch screen display unit display a picture together so that a plurality of users can watch the picture through the first touch screen display unit and the second touch screen display unit.

In a specific embodying process, both the first body 10 and the second body 20 are tablet computers. When the electronic apparatus is in the share mode, the first touch screen display unit of the first body and the second touch screen display unit of the second body can display a picture (such as an image or an interface of an application) together, so that more users can watch the picture through the first touch screen display unit and the second touch screen display unit, and so as to support control of the electronic apparatus by more users through the first touch screen display unit and the second touch screen display unit.

Further, the third mode is specifically a standby mode.

In a specific embodying process, when the first body 10 and the second body 20 are in the third relative position, the first front surface 101 and the second front surface 201 are coupled to and just face each other. The first touch screen display unit is embedded on the first front surface 101, and the second touch screen display unit or a keyboard is embedded on the second front surface 201. Therefore, when a user stops using the electronic apparatus, he can adjust the first body 10 and the second body 20 into the third relative position so that the electronic apparatus enters into the standby mode.

The technical solutions in the above second embodiment of the present application have at least the following technical effects or advantages.

1. In the embodiments of the present application, there is provided an electronic apparatus comprising: the first body, the second body, the N first coupling members disposed to the first body, and the N second coupling members disposed to the second body. A user can couple or separate the first body to or from the second body through the N first coupling members and the N second coupling members by a simple rotational operation. Therefore, the present invention effectively solves the technical problems that operation of the separable electronic apparatus is complicated during coupling or separation due to its complicated structural design, thereby achieving the technical effects of coupling or separating the two bodies of the electronic apparatus conveniently and quickly.

2. In the embodiments of the present application, the first coupling member and the second coupling member adopt the magnetic attraction force. When the first body and the second body are in the first relative position, the magnet hidden in the second coupling member can attract the iron slide bar, located in the first coupling member, into the second hole of the second coupling member to couple the first body to the second body. The first coupling member and the second coupling member not only function to couple the first body to the second body, but they also function to support the second body so that the second body is stably in the first relative position. Therefore, the present invention achieves the technical effects that the coupling process is simple and the coupling is firm.

3. In the embodiments of the present application, the electronic apparatus comprises a processor. Therefore, the electronic apparatus can be adjusted into different modes such as a notebook computer operation mode and a share operation mode based on different relative position relationships between the first body and the second body, thereby satisfying user's different requirements.

Example 2

In the example, a first electronic apparatus and a second electronic apparatus will be described. In fact, the first and second electronic apparatus are the first body 10 and the second body 20 described in the first example, respectively. Therefore, in the following description, the first electronic apparatus is named the first electronic apparatus 10 while the second electronic apparatus is named the second electronic apparatus 20. Reference may be made to FIGS. 1-7 for understanding the first electronic apparatus to be described in the example.

A first electronic apparatus 10 comprises:

N first coupling members 104, where N is an integer greater than or equal to 1;

wherein the first electronic apparatus 10 and a second electronic apparatus 20 can have at least a first relative position and a second relative position; and the second electronic apparatus 20 comprises N second coupling members 204 mated with the first coupling members 104;

when the first electronic apparatus 10 and the second electronic apparatus 20 are in the first relative position, the first electronic apparatus 10 is coupled to the second electronic apparatus 20 by cooperation of the N first coupling members 104 and the N second coupling members 204;

when the first electronic apparatus 10 and the second electronic apparatus 20 are in the second relative position, the first electronic apparatus 10 is decoupled from the second electronic apparatus 20 by cooperation of the N first coupling members 104 and the N second coupling members 204, so that the first electronic apparatus 10 is separated from the second electronic apparatus 20;

during moving the first electronic apparatus 10 and the second electronic apparatus 20 from the first relative position to the second relative position by means of an external force, the first electronic apparatus 10 rotates on a second edge 2032 of the second electronic apparatus as an axis of rotation such that the first electronic apparatus 10 is separated from a first edge 2031 of the second electronic apparatus prior to separation of the first electronic apparatus 10 from the second edge 2032 of the second electronic apparatus, and/or the second electronic apparatus 20 rotates on a second edge 1032 of the first electronic apparatus as an axis of rotation such that the second electronic apparatus 20 is separated from a first edge 1031 of the first electronic apparatus prior to separation of the second electronic apparatus 20 from the second edge 2032 of the first electronic apparatus.

Further, the first electronic apparatus 10 further comprises:
a first front surface 101 and a first back surface 102, wherein the first front surface 101 is approximately parallel to the first back surface;
a first side surface 103 which connects the first front surface 101 and the first back surface 102 and to which the N first coupling members 104 are disposed,
wherein the first edge 1031 of the first electronic apparatus is a boundary line between the first front surface 101 and the first side surface 103, the second edge 1032 of the first electronic apparatus is a boundary line between the first back surface 102 and the first side surface 103, the first front surface 101 forms a first angle with the first side surface 103, the first back surface 102 forms a second angle with the first side surface 103, the first angle is greater than 90 degrees, and the second angle is less than 90 degrees.

In addition, the second electronic apparatus 20 further comprises: a second front surface 201, a second back surface 202, and a second side surface 203 which connects the second front surface 201 and the second back surface 202 and to which the N second coupling members 204 are disposed.

The second front surface 201 is approximately parallel to the second back surface 202. The first edge 2031 of the second electronic apparatus is a boundary line between the second front surface 201 and the second side surface 203, the second edge 2032 of the second electronic apparatus is a boundary line between the second back surface 202 and the second side surface 203, the second front surface 201 forms the first angle with the second side surface 203, and the second back surface 202 forms the second angle with the second side surface 203.

When the first electronic apparatus 10 and the second electronic apparatus 20 are in the first relative position, the first side surface 103 and the second side surface 203 are coupled to and just face each other, the first front surface 101 forms a third angle with the second front surface 201, and the third angle is greater than or equal to 90 degrees.

When the first electronic apparatus 10 and the second electronic apparatus 20 are in the second relative position, the first front surface 101 forms a fourth angle with the second front surface 201, the fourth angle is equal to 180 degrees, and a distance between the second edge 1032 of the first electronic apparatus and the second edge 2032 of the second electronic apparatus is less than or equal to a first preset distance.

Furthermore, the first coupling member 104 has a first magnetic performance, and the second coupling member 204 has a second magnetic performance opposite to the first magnetic performance. When the first electronic apparatus 10 and the second electronic apparatus 20 are in the first relative position, the first electronic apparatus 10 can be coupled to the second electronic apparatus 20 by a magnetic attraction force between the N first coupling members 104 and the N second coupling members 204.

In addition, the first coupling member 104 specifically comprises:
a first hole 1041 formed in the first side surface 103;
an iron slide bar 1042 disposed in the first hole; and
an elastic element 1043 fixed to a hole bottom of the first hole 1041 and connected to the iron slide bar 1042.

The second coupling member 204 specifically comprises:
a second hole 2041 formed in the second side surface 203 to be mated with the first hole 1041; and
a magnet 2042 disposed in the second hole 2041.

When the first electronic apparatus 10 and the second electronic apparatus 20 are in the first relative position, the first hole 1041 and the second hole 2041 just face each other, and the iron slide bar 1042 enters into the second hole 2041 under the action of an attraction force of the magnet 2042 to fix the second electronic apparatus 20 so that the first electronic apparatus 10 is stably coupled to the second electronic apparatus 20.

During moving the first electronic apparatus 10 and the second electronic apparatus 20 from the first relative position to the second relative position by means of an external force, the first electronic apparatus 10 rotates on the second edge 2032 of the second electronic apparatus as an axis of rotation such that a distance between the first edge 1031 of the first electronic apparatus and the first edge 2031 of the second electronic apparatus is greater than a second preset distance value. In this case, the attraction force applied by the magnet 2042 to the iron slide bar 2041 is released, and the elastic element 1043 pulls the iron slide bar 1042 back into the first hole 1041, so that the first electronic apparatus 10 is separable from the second electronic apparatus 20.

Moreover, the first front surface 101 is provided with M third coupling members 105 with the first magnetic performance, and the second front surface 201 is provided with M fourth coupling members 205 with the second magnetic performance, where M is an integer greater than or equal to 1.

The first electronic apparatus 10 and the second electronic apparatus 20 further have a third relative position. When the first electronic apparatus 10 and the second electronic apparatus 20 are in the third relative position, the first front surface 101 and the second front surface 201 are coupled to and just face each other by a magnetic attraction force between the M third coupling members 105 and the M fourth coupling members 205.

During moving the first electronic apparatus 10 and the second electronic apparatus 20 from the third relative position to the first relative position by means of an external force, the first electronic apparatus 10 rotates on the first edge 1031 of the second electronic apparatus as an axis of rotation such that the first electronic apparatus 10 is coupled to the second edge 1032 of the second electronic apparatus, and/or the second electronic apparatus 20 rotates on the first edge 1031 of the first electronic apparatus as an axis of rotation such that the second electronic apparatus 20 is coupled to the second edge 1032 of the first electronic apparatus.

Further, the first electronic apparatus 10 further comprises:
a position detection device for detecting a relative position between the first electronic apparatus 10 and the second electronic apparatus 20.

Further, the first electronic apparatus 10 further comprises:
a processor connected to the position detection device to
control the first electronic apparatus 10 and the second electronic apparatus 20 to enter into a first mode when the first electronic apparatus 10 and the second electronic apparatus 20 are in the first position; and/or
control the first electronic apparatus 10 and the second electronic apparatus 20 to enter into a second mode when the first electronic apparatus and the second electronic apparatus are in the second position; and/or
control the first electronic apparatus 10 and the second electronic apparatus 20 to enter into a third mode when the first electronic apparatus and the second electronic apparatus are in the third position.

Since the first electronic apparatus described in this example is actually the first body described in the first example, a person having ordinary skill in the art could understand the specific embodiments of the first electronic apparatus described in this example and their variations, based on the description of the first body described in the first example. Therefore, how to embody the first electronic apparatus is no longer described in detail.

Although the exemplary preferred embodiments have been shown and described, it would be appreciated by a person skilled in the art that many other modifications or changes in accord with the embodiments can be directly determined or deducted according to the contents disclosed in the present application. Therefore, the appended claims are intended to be construed to include the exemplary preferred embodiments and all of the modifications and changes falling within the scope the present invention.

Apparently, it will be understood by those skilled in the art that various changes, modifications, substitutions and alterations may be made without departing from the spirit and scope of the invention. Therefore, if the changes, modifications, substitutions and alterations of the present invention belong to the scope defined in the appended claims of the present invention and their equivalents, the present invention is intended to include the changes, modifications, substitutions and alterations.

The invention claimed is:

1. An electronic apparatus comprising:
a first body including N first coupling members, where N is an integer greater than or equal to 1;
a second body including N second coupling members mated with the first coupling members, wherein when the first body and the second body are kept in contact with each other, the first body is coupled to the second body by cooperation of the N first coupling members and the N second coupling members if the first body and the second body are in a first relative position, and the first body is decoupled from the second body so that the first body is separable from the second body by cooperation of the N first coupling members and the N second coupling members if the first body and the second body are in a second relative position different from the first relative position.

2. The electronic apparatus of claim 1, wherein the first body can move relative to the second body in a first manner and a second manner different from the first manner, wherein the first body is decoupled from the second body after the first body moves relative to the second body in the first manner from the first relative position to the second relative position, and the first body is still kept coupled to the second body after the first body moves relative to the second body in the second manner from the first relative position to the second relative position.

3. The electronic apparatus of claim 2, wherein after the first body moves relative to the second body in the first manner from the first relative position to the second relative position, the N first coupling members switch from a first state to a second state different from the first state, and are decoupled from the N second coupling members so that the first body is decoupled from the second body.

4. The electronic apparatus of claim 1, wherein the second body further comprises a shaft, and the shaft is disposed on a first side of the N second coupling members so that when the first body and the second body are kept in contact with each other, the first body can rotate relative to the second body around the shaft from the first relative position to the second relative position.

5. The electronic apparatus of claim 4, wherein when the first body and the second body continuously rotate through the shaft from the first relative position through at least one transition position included between the first relative position and the second relative position to the second relative position, the first body is decoupled from the second body so that the first body is separable from the second body.

6. A docking station, wherein the docking station can be separably coupled to an electronic apparatus, and the electronic apparatus is provided with N first coupling members, where N is an integer greater than or equal to 1, and wherein the docking station comprises:
N second coupling members mated with the N first coupling members, wherein when the electronic apparatus and the docking station are kept in contact with each other, the electronic apparatus is coupled to the docking station by cooperation of the N first coupling members and the N second coupling members if the electronic apparatus and the docking station are in a first relative position, and the electronic apparatus is decoupled from the docking station so that the electronic apparatus is separable from the docking station by cooperation of the N first coupling members and the N second coupling members if the electronic apparatus and the docking station are in a second relative position different from the first relative position.

7. The docking station of claim 6, wherein the electronic apparatus can move relative to the docking station in a first manner and a second manner different from the first manner, wherein the electronic apparatus is decoupled from the docking station when the electronic apparatus moves relative to the docking station in the first manner from the first relative position to the second relative position, and the electronic apparatus is still kept coupled to the docking station when the electronic apparatus moves relative to the docking station in the second manner from the first relative position to the second relative position, and/or
when the electronic apparatus moves relative to the docking station in the first manner from the first relative position to the second relative position, the N first coupling members switch from a first state to a second state different from the first state, and are decoupled from the N second coupling members so that the electronic apparatus is decoupled from the docking station.

8. The docking station of claim 6, wherein the docking station further comprises a shaft, and the shaft is disposed on a first side of the N second coupling members so that when the electronic apparatus and the docking station are kept in contact with each other, the electronic apparatus can rotate relative to the docking station around the shaft from the first relative position to the second relative position, and/or
when the electronic apparatus and the docking station continuously rotate through the shaft from the first relative position through at least one transition position included between the first relative position and the second relative position to the second relative position, the electronic apparatus is decoupled from the docking station so that the electronic apparatus is separable from the docking station.

9. The docking station of claim 8, further comprising: a first cam fitted over the shaft, wherein the first cam comprises:
a first engagement member;
a second engagement member; and
a linkage member disposed to the second engagement member to be capable of being separably connected to the second coupling member,
wherein during rotation of the electronic apparatus relative to the docking station from the first relative position to the second relative position, the first engagement member rotates relative to the second engagement member from a first position to a second position, such that the second engagement member slides relative to the shaft in a first direction and drives the second coupling member to slide in the first direction through the linkage member, so that the first coupling member is decoupled from the second coupling member, and thus the electronic apparatus is separable from the docking station.

10. The docking station of claim 9, wherein the first engagement member comprises a first end provided with at least two recesses;
the second engagement member comprises a second end and a third end different from the second end, the second end is provided with at least two protrusions mated with the at least two recesses, and the linkage member is disposed to the third end; and
when the first engagement member is in the first position relative to the second engagement member, the at least two recesses and the at least two protrusions are in a first state; and when the first engagement member is in the second position relative to the second engagement member, the at least two recesses and the at least two protrusions are in a second state different from the first state.

11. The docking station of claim 6, wherein the docking station further comprises a force application mechanism, and the force application mechanism is configured to provide a first force to the electronic apparatus such that the electronic apparatus is decoupled and separated from the docking station, when the electronic apparatus and the docking station are in the second relative position.

12. The docking station of claim 6, wherein when the electronic apparatus is in the second relative position relative to the docking station, a proportion in which an external force applied by a user to the electronic apparatus and/or the docking station is converted into a first force is greater than a first threshold, wherein the first force is a minimal force by which the electronic apparatus can be separated from the docking station.

13. An electronic apparatus comprising:
a first body including N first coupling members, where N is an integer greater than or equal to 1; and
a second body including N second coupling members mated with the first coupling members,
wherein the first body and the second body have at least a first relative position and a second relative position;
when the first body and the second body are in the first relative position, the first body is coupled to the second body by cooperation of the N first coupling members and the N second coupling members;
when the first body and the second body are in the second relative position, the first body is decoupled from the second body by cooperation of the N first coupling members and the N second coupling members, so that the first body is separated from the second body;
during moving the first body and the second body from the first relative position to the second relative position by means of an external force, the first body rotates on a second edge of the second body as an axis of rotation such that the first body is separated from a first edge of the second body prior to separation of the first body from the second edge of the second body, and/or the second body rotates on a second edge of the first body as an axis of rotation such that the second body is separated from a first edge of the first body prior to separation of the second body from the second edge of the first body.

14. The electronic apparatus of claim 13, wherein the first body further comprises:
a first front surface;
a first back surface; and
a first side surface which connects the first front surface and the first back surface and to which the N first coupling members are disposed,
wherein the first edge of the first body is a boundary line between the first front surface and the first side surface, the second edge of the first body is a boundary line between the first back surface and the first side surface, the first front surface forms a first angle with the first side surface, the first back surface forms a second angle with the first side surface, the first angle is greater than 90 degrees, and the second angle is less than 90 degrees, and/or
wherein the second body further comprises:
a second front surface;
a second back surface; and
a second side surface which connects the second front surface and the second back surface and to which the N second coupling members are disposed,
wherein the first edge of the second body is a boundary line between the second front surface and the second side surface, the second edge of the second body is a boundary line between the second back surface and the second side surface, the second front surface forms the first angle with the second side surface, and the second back surface forms the second angle with the second side surface;
when the first body and the second body are in the first relative position, the first side surface and the second side surface are coupled to and just face each other, the first front surface forms a third angle with the second front surface, and the third angle is greater than or equal to 90 degrees; and
when the first body and the second body are in the second relative position, the first front surface forms a fourth angle with the second front surface, the fourth angle is equal to 180 degrees, and a distance between the second edge of the first body and the second edge of the second body is less than or equal to a first preset distance.

15. The electronic apparatus of claim 14, wherein the first coupling member has a first magnetic performance, and the second coupling member has a second magnetic performance opposite to the first magnetic performance, wherein when the first body and the second body are in the first relative position, the first body can be coupled to the second body by a magnetic attraction force between the N first coupling members and the N second coupling members.

16. The electronic apparatus of claim 14, wherein the first coupling member comprises:
a first hole formed in the first side surface;
an iron slide bar disposed in the first hole; and
an elastic element fixed to a hole bottom of the first hole and connected to the iron slide bar.

17. The electronic apparatus of claim 16, wherein the second coupling member comprises:
a second hole formed in the second side surface to be mated with the first hole; and
a magnet disposed in the second hole,
wherein when the first body and the second body are in the first relative position, the first hole and the second hole just face each other, and the iron slide bar enters into the second hole under the action of an attraction force of the magnet to fix the second body so that the first body is stably coupled to the second body; and
during moving the first body and the second body from the first relative position to the second relative position by means of an external force, the first body rotates on the second edge of the second body as an axis of rotation such that a distance between the first edge of the first body and the first edge of the second body is greater than a second preset distance, so that the attraction force applied by the magnet to the iron slide bar is released, the elastic element pulls the iron slide bar back into the first hole, and the first body is separated from the second body.

18. The electronic apparatus of claim 17, wherein the first front surface is provided with M third coupling members with the first magnetic performance, and the second front surface is provided with M fourth coupling members with the second magnetic performance, where M is an integer greater than or equal to 1;

wherein the first body and the second body further have a third relative position, and wherein when the first body and the second body are in the third relative position, the first front surface and the second front surface are coupled to and just face each other by a magnetic attraction force between the M third coupling members and the M fourth coupling members; and during moving the first body and the second body from the third relative position to the first relative position by means of an external force, the first body rotates on the first edge of the second body as an axis of rotation such that the first body is coupled to the second edge of the second body, and/or the second body rotates on the first edge of the first body as an axis of rotation such that the second body is coupled to the second edge of the first body.

19. The electronic apparatus of claim 18, further comprising:

a position detection device disposed in the first body and/or the second body for detecting a relative position between the first body and the second body, and/or the electronic apparatus further comprises:

a processor disposed in the first body or the second body and connected to the position detection device to control the electronic apparatus to enter into a first mode when the first body and the second body are in the first relative position; and/or control the electronic apparatus to enter into a second mode when the first body and the second body are in the second relative position; and/or control the electronic apparatus to enter into a third mode when the first body and the second body are in the third relative position.

20. The electronic apparatus of claim 19, wherein the first body further comprises:

a first functional body located in a first accommodation chamber formed by the first front surface, the first side surface and the first back surface; and a first touch screen display unit embedded on the first front surface; and the second body further comprises:

a second functional body located in a second accommodation chamber formed by the second front surface, the second side surface and the second back surface; and a second touch screen display unit embedded on the second front surface.

* * * * *